United States Patent
Bergdale et al.

(10) Patent No.: US 12,254,477 B2
(45) Date of Patent: *Mar. 18, 2025

(54) METHOD AND SYSTEM FOR PROVIDING VISUAL VALIDATION OF ELECTRONIC TICKETS AND PAYMENT FOR AN ADDITIONAL ITEM

(71) Applicant: SIEMENS MOBILITY, INC., New York, NY (US)

(72) Inventors: Micah Bergdale, Bronx, NY (US); Edward Donovan, New York, NY (US); Nicholas Ihm, Newtown, CT (US); Michael O'Haire, Smithtown, NY (US)

(73) Assignee: Siemens Mobility, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/656,338

(22) Filed: Mar. 24, 2022

(65) Prior Publication Data

US 2022/0222684 A1    Jul. 14, 2022

Related U.S. Application Data

(63) Continuation of application No. 16/136,924, filed on Sep. 20, 2018, now abandoned, which is a
(Continued)

(51) Int. Cl.
*G06Q 10/02* (2012.01)
*G06Q 20/04* (2012.01)
(Continued)

(52) U.S. Cl.
CPC ....... *G06Q 30/0185* (2013.01); *G06Q 10/02* (2013.01); *G06Q 20/0457* (2013.01);
(Continued)

(58) Field of Classification Search
CPC ...... G06Q 10/02; G06Q 20/18; G06Q 20/327; G06Q 20/32; G06Q 20/3278; G06Q 50/30;
(Continued)

(56) References Cited

U.S. PATENT DOCUMENTS

| 7,114,179 B1 | 9/2006 | Ritter et al. |
| 8,259,568 B2 | 9/2012 | Boroday et al. |

(Continued)

FOREIGN PATENT DOCUMENTS

| JP | 2001266178 A | 9/2001 |
| JP | 2006201997 A | 8/2006 |

OTHER PUBLICATIONS

Croft, John. "Faster, Better, Cheaper Passenger Processing." Air Transport World 42.3 (2005): E10-1. ProQuest. Web. Jan. 7, 2025 (Year: 2005).*

(Continued)

*Primary Examiner* — Michael P Harrington

(57) ABSTRACT

This invention discloses novel systems and methods for providing visual confirmation that a passenger has a valid ticket and has previously paid for additional items such as luggage, suitcase, briefcase, bicycle, musical instrument, wheelchair, car, vehicle, motorcycle, automobile (in the case of, for example, a ferry). The visual validation display object allows tickets and additional items to be easily and quickly confirmed.

37 Claims, 24 Drawing Sheets

Related U.S. Application Data continuation-in-part of application No. 15/692,503, filed on Aug. 31, 2017, now Pat. No. 10,453,067, and a continuation-in-part of application No. 14/751,570, filed on Jun. 26, 2015, now Pat. No. 10,127,746, and a continuation-in-part of application No. 14/597,965, filed on Jan. 15, 2015, now abandoned, and a continuation-in-part of application No. 14/538,008, filed on Nov. 11, 2014, now abandoned, said application No. 14/597,965 is a continuation-in-part of application No. 13/901,243, filed on May 23, 2013, now Pat. No. 9,239,993, and a continuation-in-part of application No. 13/475,881, filed on May 18, 2012, now Pat. No. 8,494,967, and a continuation-in-part of application No. 13/110,709, filed on May 18, 2011, now abandoned, said application No. 13/901,243 is a continuation-in-part of application No. 13/046,413, filed on Mar. 11, 2011, now Pat. No. 10,089,606.

(60) Provisional application No. 62/721,326, filed on Aug. 22, 2018, provisional application No. 61/948,187, filed on Mar. 5, 2014, provisional application No. 61/927,915, filed on Jan. 15, 2014, provisional application No. 61/902,469, filed on Nov. 11, 2013.

(51) Int. Cl.
  *G06Q 20/32* (2012.01)
  *G06Q 30/018* (2023.01)
  *G07C 9/29* (2020.01)
  *G06Q 30/0241* (2023.01)

(52) U.S. Cl.
  CPC ........... *G06Q 20/3274* (2013.01); *G07C 9/29* (2020.01); *G06Q 30/0241* (2013.01)

(58) Field of Classification Search
  CPC ...... G06Q 20/20; G06Q 30/00; G06Q 20/047; G06Q 20/3227; G06Q 20/3274; G06Q 20/3276
  See application file for complete search history.

(56) References Cited

U.S. PATENT DOCUMENTS

| | | | |
|---|---|---|---|
| 8,494,967 B2* | 7/2013 | Bergdale | G06Q 30/0255 705/68 |
| 2002/0134836 A1* | 9/2002 | Cash | G06Q 10/08 235/385 |
| 2004/0124982 A1* | 7/2004 | Kovach | G08B 13/2417 340/572.1 |
| 2005/0204140 A1 | 9/2005 | Maruyama et al. | |
| 2007/0276944 A1 | 11/2007 | Goldberg et al. | |
| 2008/0303637 A1* | 12/2008 | Gelbman | G06K 19/07703 340/10.42 |
| 2009/0055288 A1 | 2/2009 | Nassimi | |
| 2015/0095254 A1* | 4/2015 | Naber | G06Q 50/30 705/330 |

OTHER PUBLICATIONS

"E-Tickets Speed up Airport Check-Ins: [Toronto Edition 1]." National Post, Feb. 16, 2000, p. F.7. ProQuest. Web. Jan. 7, 2025 https://dialog.proquest.com/professional/docview/329557853?accountid=131444 (Year: 2000).*

Bytemark Inc., Method and System for Distributing Electronic Tickets With Visual Display for Verification, Petition for IPR (764), U.S. Pat. No. 10,346,764, Filing Date Aug. 11, 2015, Issue Date Jul. 9, 2019, pp. 1-74.

Bytemark Inc., Method and System for Distributing Electronic Tickets With Visual Display for Verification, IPR2022-0062 DI, U.S. Pat. No. 10,346,764 B2, pp. 1-35.

Bytemark Inc., Method and System for Distributing Electronic Tickets With Data Integrity Checking, IPR2022-00624 DI, U.S. Pat. No. 10,360,567 B2, pp. 1-19.

Bytemark, Inc., Method and System for Distributing Electronic Tickets With Data Integrity Checking, Petition for IPR (567), U.S. Pat. No. 10,60,567, Filing Date May 23, 2014, Issue Date Jul. 23, 2019, pp. 1-69.

* cited by examiner

Figure 7

| Venue ID |
|---|
| Username |
| Password |

METHOD AND SYSTEM FOR PROVIDING VISUAL VALIDATION OF ELECTRONIC TICKETS AND PAYMENT FOR AN ADDITIONAL ITEM

PRIORITY CLAIM

This patent application is a continuation of U.S. patent application Ser. No. 16/136,924 filed Sep. 20, 2018, which claims priority to U.S. patent application Ser. No. 14/597,965 filed Jan. 15, 2015 as a continuing application (now abandoned), which claims priority from provisional patent application 61/927,915 filed Jan. 15, 2014, claims priority to application Ser. No. 13/901,243 (now U.S. Pat. No. 9,239,993) filed May 23, 2013 as a continuation-in-part, claims priority to application Ser. No. 13/475,881 (now U.S. Pat. No. 8,494,967) filed May 18, 2012 as a continuation-in-part, claims priority to application Ser. No. 13/110,709 (now abandoned) filed May 18, 2011 as a continuation-in-part and application Ser. No. 13/046,413 filed Mar. 11, 2011 as a continuation-in-part (now U.S. Pat. No. 10,089,606).

This patent application claims priority to U.S. patent application Ser. No. 14/538,008 filed Nov. 11, 2014 (now abandoned) which claims priority to provisional patent application 61/902,469 filed Nov. 11, 2013.

This application claims priority to U.S. patent application Ser. No. 14/751,570 filed Jun. 26, 2015 (now U.S. Pat. No. 10,127,746), which claims priority to provisional patent application 61/948,187 filed Mar. 5, 2014.

This application claims priority to provisional patent application 62/721,326 filed Aug. 22, 2018.

This application is a continuation-in-part of application Ser. No. 15/692,503 filed Aug. 31, 2017 (now U.S. Pat. No. 10,453,067). The contents of each of the above reference patent applications are incorporated by reference herein in their entireties.

FIELD OF INVENTION

This invention provides a mechanism whereby a venue or other facility that meters usage by means of tickets can distribute tickets electronically and use a visual aid on an electronic device to visually confirm that a person is a valid ticket holder and to confirm that an additional item has been paid for. A transportation passenger who is paying a fare for riding a form of transportation (airplane, bus, train, ferry, etc.) may sometimes bring/carry-on a piece of luggage, suitcase, briefcase, bicycle, musical instrument, wheelchair, car/vehicle/automobile (in the case of a ferry that carries both passengers and cars). Many transportation providers will charge an extra fee for a passenger to bring onboard any of these items. As ticketing/fare payments have become more automated, transportation providers are looking for methods to make sure that passengers are paying a carry-on or bring-on-board cost associated with their fare.

BACKGROUND

Venues such as theaters, amusement parks and other facilities that use tickets, for example airlines, ferries and other transportation have a need to use electronic ticketing. Existing systems distribute information that can constitute a ticket, but the verification problem is difficult. In one example of prior art, an electronic ticket is displayed as a bar-code on the recipient's telephone display screen. The telephone is then placed on a scanner that reads the bar-code in order to verify the ticket. The problem with these systems is that the scanning process is fraught with error and the time taken to verify the electronic ticket far exceeds that of the old system: looking at the paper ticket and tearing it in half. Barcode scanners were not designed to read a lit LCD screen displaying a bar code. The reflectivity of the screen can defeat the scanning process. Therefore, there is a need for an electronic ticketing system that provides a human-perceivable visual display that the venue can rely on to verify the ticket. This invention provides for the distribution of an electronic ticket that also contains a visual display that ticket takers can rely on as verification, without using a scanning device.

DESCRIPTION OF THE FIGURES

FIG. 7. Schematic of authorized user database record.

DETAILED DESCRIPTION OF THE PREFERRED EMBODIMENTS

Figure 1:
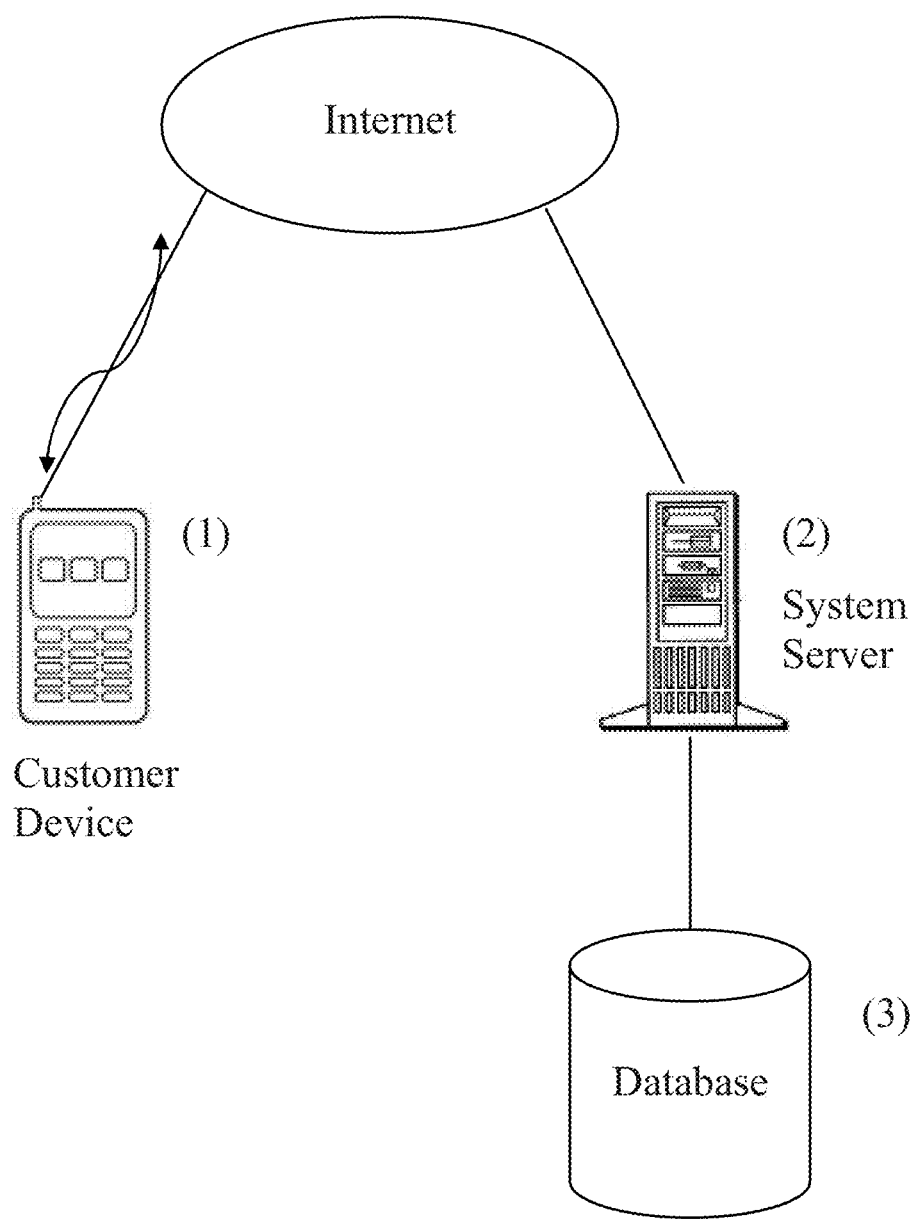
FIG. 1. Basic architecture.
Figure 2:
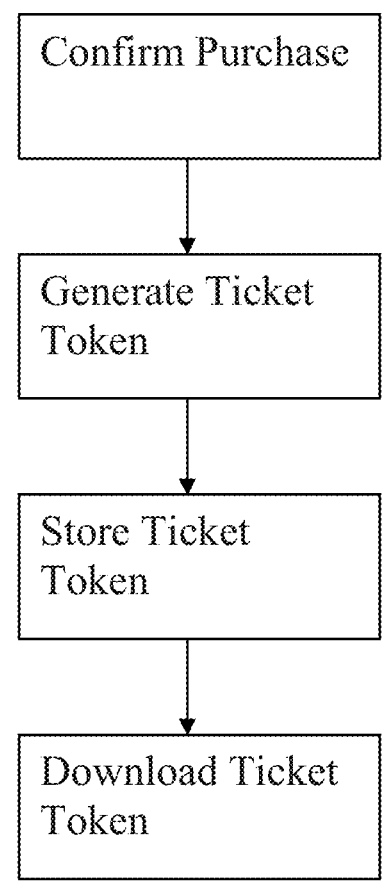
FIG. 2. Flow chart for ticket purchase.
Figure 3:
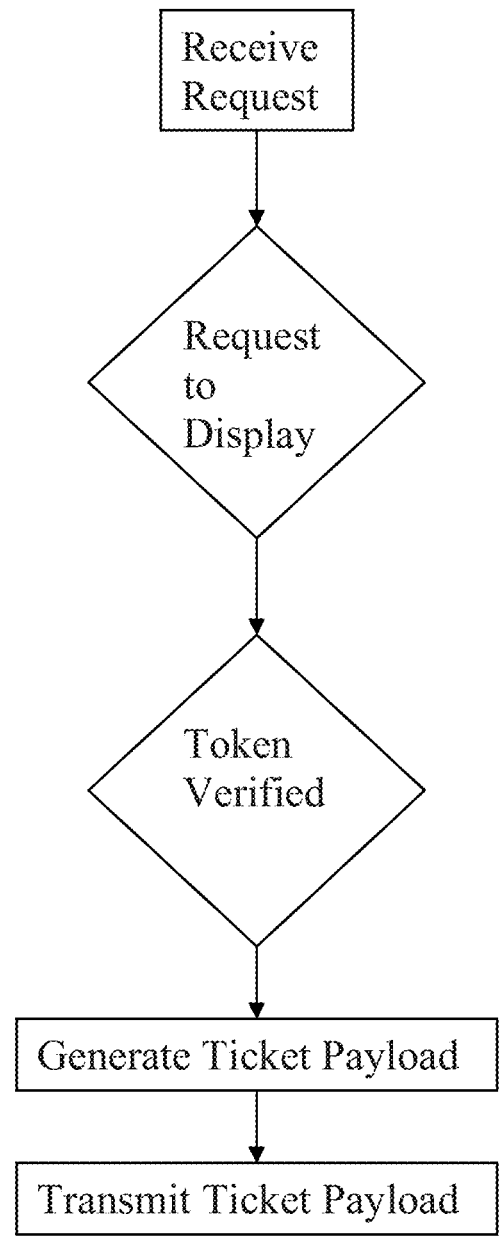
FIG. 3. Flow chart for displaying the verifying visual object.
Figure 4:
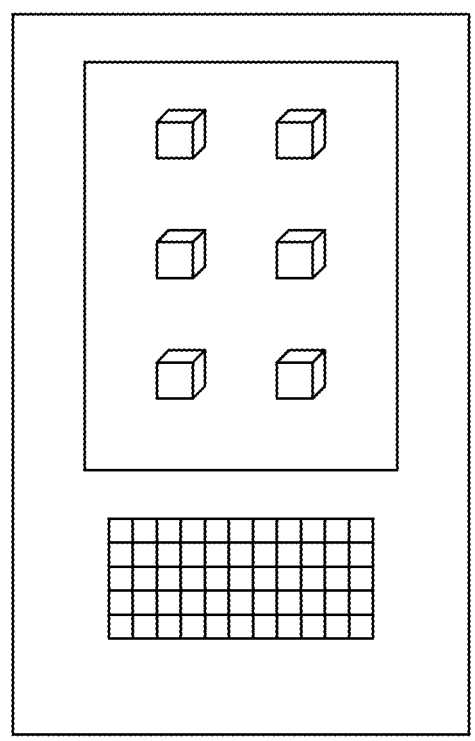
FIG. 4. Example validating visual object.
Figure 5:
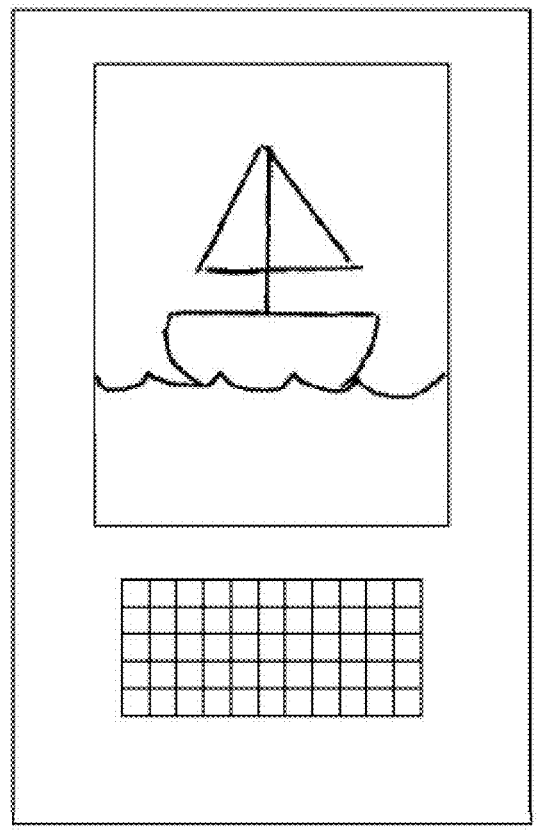
FIG. 5. Example validating visual object
FIG. 6. Schematic of event database record.

The system operates on one or more computers, typically one or more file servers connected to the Internet and also on a customer's computing device. A customer's device can be a personal computer, mobile phone, mobile handheld device like a Blackberry™ or iPhone™ or any other kind of computing device a user can use to send and receive data messages. The customer's device is used to display the validating visual object.

Conventional electronic tickets display a barcode or QR code on a user's telephone, typically a cellphone or other portable wireless device with a display screen. The problem with this approach is that a barcode scanner has to be used by the ticket taker. Barcode scanners are not highly compatible with LCD screen displays of barcodes. The amount of time that it takes to process an electronic ticket is greater than that of a paper ticket. Sometimes the LCD display does not scan at all and a passenger has to be sent away to get a paper printout of a ticket. Given the potential large crowds that often attend open venues, this is impractical.

In this invention, the ticket is procured electronically and stored on the user's device. However, when the ticket is to be taken the verification is determined by a larger visual object that a human can perceive without a machine scanning it. The particular validating visual object chosen can be constantly changed so that the ticket taker does not have to be concerned that a device displaying the designated validating visual object is invalid. There are many types of visual objects that can be displayed that are easily recognized by a ticket taker. These can include but are not limited to: Patterns of color change, Animations and Geometric patterns. In one embodiment, the validating visual object that is transmitted can be computer code, that when executed by the device, causes the user device to display the desired visual pattern. In another embodiment, the validating visual object is a command that specifies what the visual pattern should be. In that embodiment, the program operating on the user's device receives the command instruction, decodes it, and determines what visual patterns to generate based on the data in the command instruction. In another embodiment, the validating visual object is video or image data transmitted directly from the server to the device for immediate display.

In one embodiment of the invention, the user purchases a ticket from an on-line website. The website sends to the user's device a unique number, referred to as a token. The token is also stored in the ticketing database. When the time comes to present the ticket, the venue can select what visual indicator will be used as the designated validation visual object. The user can then request the validation visual object. The user's device will have an application that launches a user interface. The user can select "validate" or some other equivalent command to cause the application to fetch and download from the ticketing system a data object referred to herein as a ticket payload, which includes a program to run on the user's device. In another embodiment, the ticket payload can be pushed to the device by the venue. As a result, the application transmitted to the user's device is previously unknown to the user and not resident in the user's device. At that point the user's device can execute the program embodied in the ticket payload, which causes the validation visual object to be displayed on the user's device. The ticket taker knows what the validating visual object is, and simply looks to see that the user's device is displaying the correct visual object.

Piracy is limited in several ways. First, the ticket holder and their device does not have access to the validating visual object until a time select to be close to the point in time where the ticket has to be presented. Second, the validating visual object is one of a very large number of permutations and therefore cannot be guessed, selected or copied ahead of time. Third, the ticket payload can contain code that destroys the validating visual object in a pre-determined period of time after initial display or upon some pre-determined input event. Fourth, a number of security protocols can be utilized to ensure that a copy of the application that executes to display the validating visual object cannot be readily copied or reverse engineered.

Validating Visual Object Displays:

There many kinds of validation displays that can be utilized. The criterion for what constitutes a validating visual object is one that is readily recognizable from human observation, is encapsulated in such a way as to be transmitted to the customer's device with a minimum of network latency or download time, and that can be reasonably secured so as to avoid piracy. Barcodes and similar codes like the QR code are not validating visual objects because a person looking at them cannot tell one apart from another. Instead, the person has to rely on a barcode scanner and computing device to verify the barcode.

In one embodiment, the period that a particular validating visual object may be used is automatically limited. It is noted that the terms visual validation display object, verifying visual object and validating visual object are used interchangeably and refer to the same thing. Examples of validating visual objects include:

1. A color display on the device.
2. A color sequence.
3. An animation that is easily recognized.
4. Animations can include easily recognizable geometric patterns, for example an array of diamonds, or an array of rotating cubes.
5. A human recognizable image.
6. The customer's face as an image.
7. Combinations of the above.

In another embodiment, other images, for example, block letter, can be displayed so that additional information readily apparent to the ticket taker is displayed. For example, a letter can be designated for a Child ticket or a different letter for an Adult ticket. In this embodiment, the type of user may by a senior, child, military personnel, student, or some other pre-designated category of user with a special ticket or use privileges. As part of the ticket issuance process, there is a verification process to ensure that the ticketing type actually matches up with the ticket that should be allowed for that end user. If a ticket is purchased by a user and the ticket has a special attribute associated with the ticket, the data record associated with the user is updated to include the status. For example, the user data record can be updated to include a "SENIOR" flag. The user account is authenticated to allow for a certain type of discounted or other special ticketing. This can happen by means of submitting an ID string and the ID being validated to the registered user and the registered user device. Using whatever verification is appropriate results in the user data record being updated so that a logic flag or data value is indicated and associated with the ticketing type. The user account is associated with a specific mobile device. Following along the same process that is described below where a third party can manage a ticket and funds distribution to a mobile device, a mobile device can be locked to a user account for the purposes of receiving special ticket types, special deals, discounts, etc. that would only apply to that end user. The applicability of this could go much further too. By locking user devices to a user account and implementing a credential verification method, airlines could ensure that the mobile device being used for ticketing or club access or special discounts is the authorized user device for that user account and the ticket issued. Once the ticket has issued, determining the identity of the user would not be necessary because the validation of the ticket alone would indicate that it has to be that person who is bringing up the ticket since only a specific device could bring up a ticket for that user account. In other words, the security of the ticket is at the level of the security of the user account, in that the user is determined to hold the right to the special privileges and then this data is stored with their account. In one embodiment, the system uses a third party account and device management component. In another embodiment, the ticket issuer can directly manage the user account and associated device(s) for the purposes of allowing specialized ticketing, access, and discount solutions to the user by that ticket issuer. This helps prevent leakage from a person distributing out tickets, access, and discounts to the non-intended user and does not require the person processing the discount or checking the ticket to have to look at an actual ID. For example, if the visual object displays a notification that the ticket shows Military, the device itself has been authorized to allow that user to bring up a Military discounted ticket. Further, other embodiments include determining a security or privilege status for the mobile device as well as its components, for example, RAM, ROM, swappable parts like SIM cards, USB sticks, and other memory devices on which is stored security tokens and other secure data for the purpose of providing a secure platform, including memory integrated into the mobile device.

Referring now to FIG. 1, the customer uses their device (1) to purchase a ticket from the service operating the system server (2) and database (3).

Figure 7:
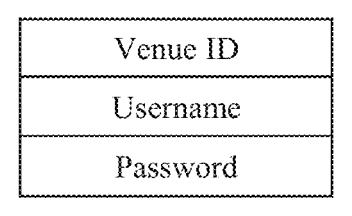

In one embodiment, an authorized user associated with the venue, typically the box office manager, logs into the back-end system through a secure web-page. The authorized user can enter the web-page by entering a username, password and venue identifier. The system maintains a database (3) that associates the venue identifier with a set of usernames and password pairs that are authorized to use the system on behalf of the venue. See FIG. 7. The system checks the database (3) to verify that the venue ID, username and password are consistent with each other. The authorized user can navigate through to a point in the system user interface where a particular show may be selected for ticket taking. The user selects the upcoming show, and then selects from a display of possible validating visual objects. The validating visual object is transmitted to a device viewable by ticket taking staff at the entrances to the venue. The staff then can see the authorized object to accept for the upcoming show.

Figure 6:
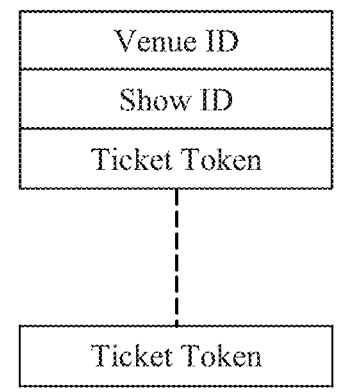
Figure 8:
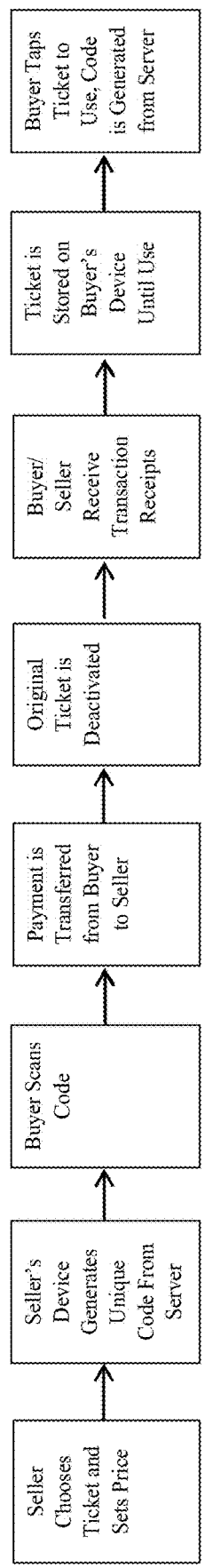
FIG. 8. Flow chart for transfer of ticket.

Ticket holders that have purchased tickets have a data record in the system database that contains the unique token associated with the ticket and other relevant information, including the venueID and an identifier identifying the specific show the ticket is for. See FIG. 6. At the entrance, customers are requested to operate an application on their devices. This application fetches the stored ticket token and transmits that token to the system, preferably over a secure data channel. The database looks up the token to check that the token is valid for the upcoming show. If the token is valid, then the system transmits back to the device a ticket payload. The ticket payload contains computer code that, when operated, displays the selected validating visual object.

Figure 9:
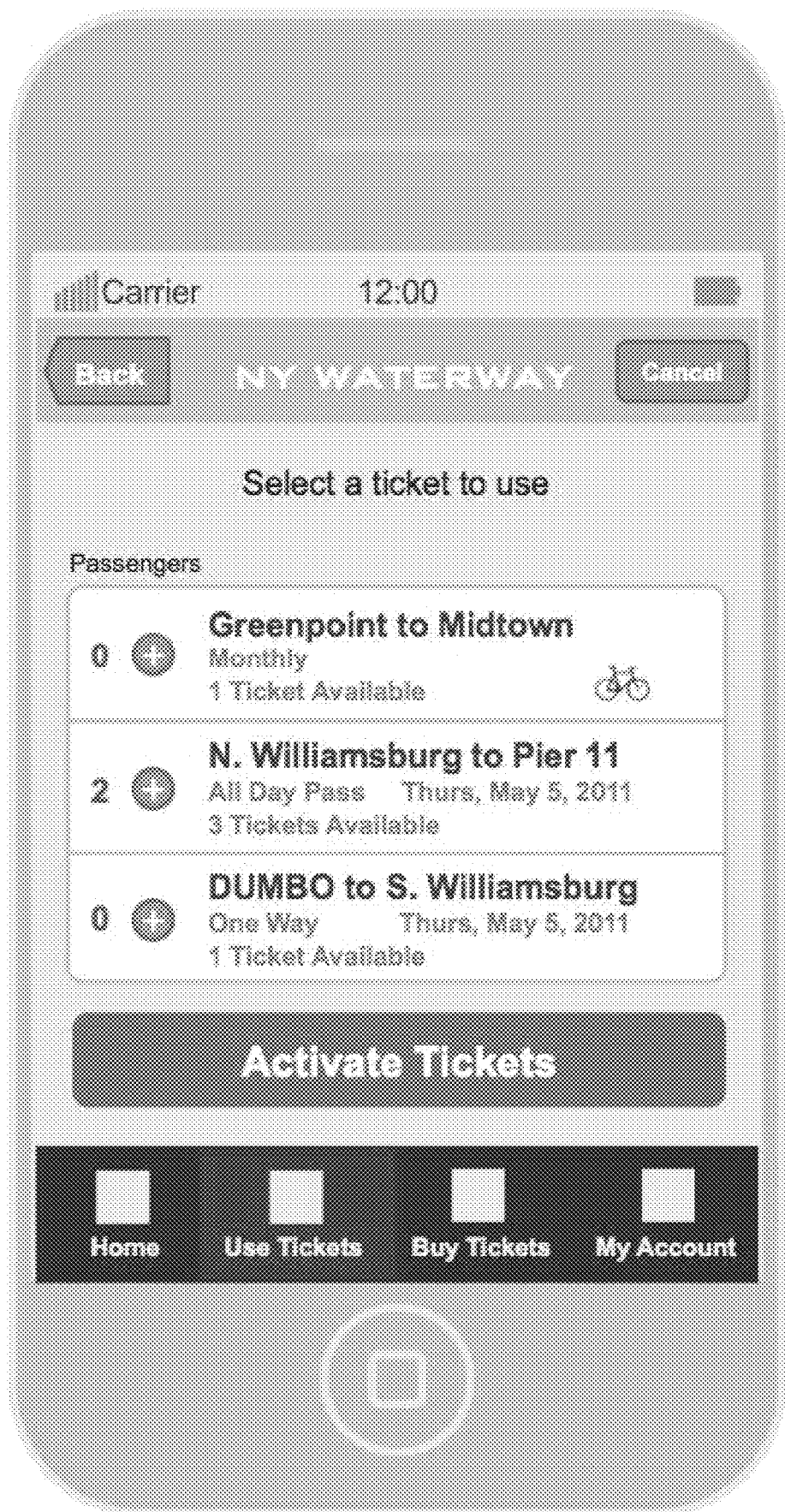
FIG. 9. Example user interface on user's device.
Figure 10:
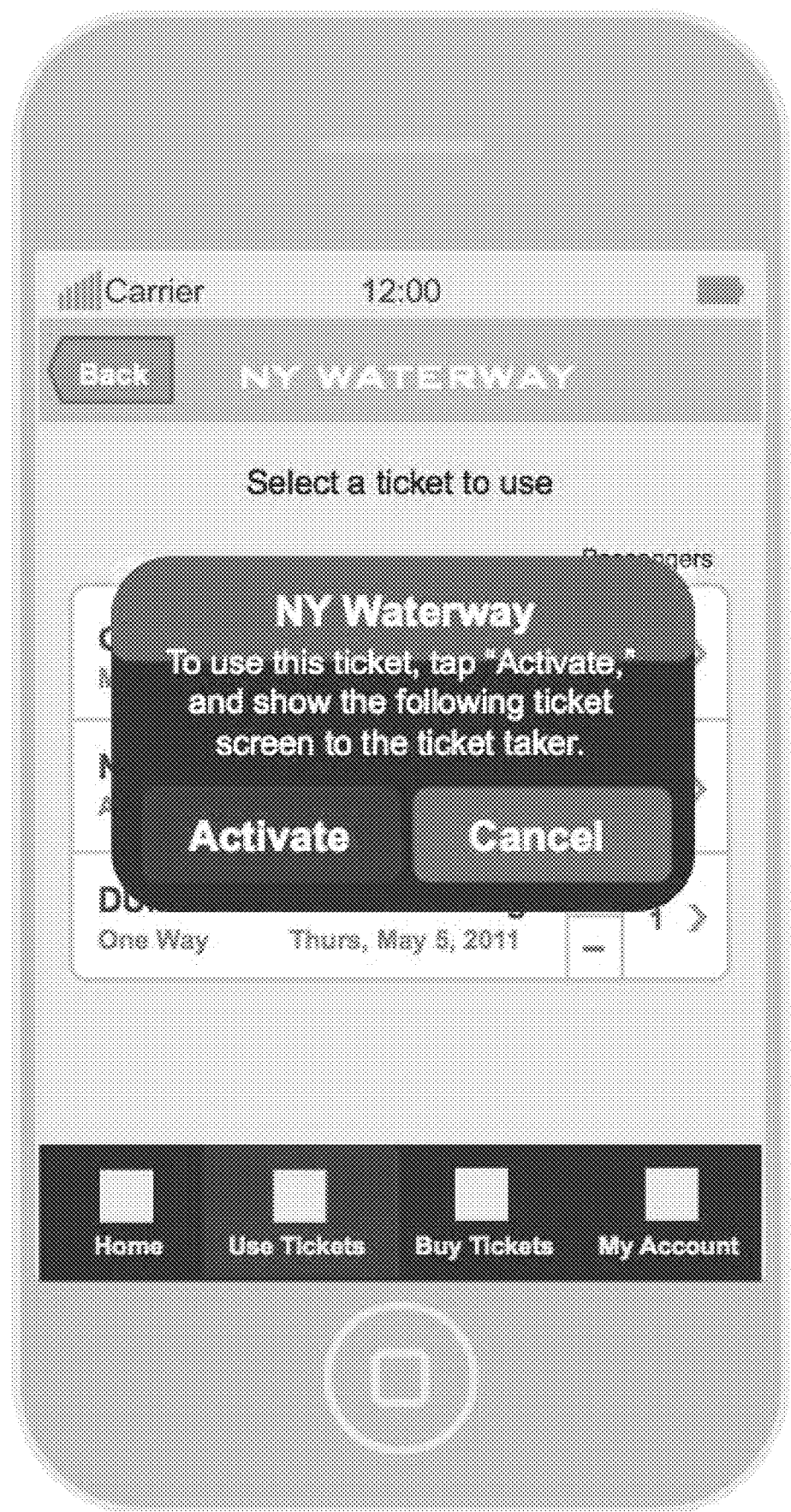
FIG. 10. Example user interface showing activation selection screen.
Figure 11:
FIG. 11. Example user interface showing display of validating visual object and other ticketing information.

The customer can navigate the user interface of the application in order to cause the application to request whether to display the validating visual object. As shown in FIG. 9, one or more available tickets can be displayed on the user interface, which provides the user the ability to select one of the tickets. When the customer properly actuates the user interface, for example, by actuating the "Activate Tickets" button (see FIG. 10), the validating visual object is displayed on the screen of the device. The animation can be presented along with other ticketing information (see FIG. 11). In one embodiment, the device transmits the ticket token to the system with a command indicating that the ticket has been used. In another embodiment, the customer can operate the application and request that the application transmit to the database the condition that the ticket was used. In that embodiment, the user can input a numeric code or password that the application uses to verify that the customer is confirming use of the ticket. In yet another embodiment, after the validating visual object has been launched, a predetermined amount of time later it can be deemed used. At that time, the application can cause the color of the object to be changed so that it indicates that there was a valid ticket, but the ticket was used. This condition is useful in cases where the venue checks tickets during shows while letting customers move around the venue's facilities.

In another embodiment, the purchase of the ticket causes the ticket payload to be downloaded to the customer's device. Likewise, the authorized user for the venue will select a validating visual object for a particular show well in advance of the show. In this case, because a customer may possess the payload some time before its use, precautions must be taken to secure the ticket payload from being hacked so that any similar device can display the validating visual object. While this is a security tradeoff, the benefit is that the customer need not have an Internet connection at a time close to the showtime of the venue.

The use of electronic ticketing provides opportunities that change how tickets can be bought and sold. For example a first customer can purchase a ticket and receive on their device a ticket token. A second customer can purchase that ticket using the system. The first customer can use the application to send a message to the system server indicating that the first customer intends to the web-page indicating that it wants to buy that particular ticket. The system can ask the first customer for a username and password to be associated with the first customer's ticket. If the second customer identifies the first customer's username, the system then can match the two together. At that point, the data record associated with the first customer's ticket is modified so that the ticket token value is changed to a new value. That new ticket token value is then transmitted to the second customer's device. At the same time, the system can operate a typical on-line payment and credit system that secures payment from the second customer and credits the first customer. In one embodiment, the system pays the first customer a discounted amount, retaining the balance as a fee.

In yet another embodiment, the first customer may be unknown to the second customer. In that embodiment, the first customer simply may indicate to the system, through a message transmitted from the application operating on the device or directly through a web-page, that the first customer is not going to use the ticket and wishes to sell it. At that point, the system can mark the data record associated with the ticket as "available for sale." When the second customer makes a request to purchase a ticket for the same show, the system creates a new ticket token for the second customer and updates the ticket token stored in the data record.

In a general admission type of scenario, the ticketing database is simple: each show has a venue ID, some identifier associated with the show itself, various time indicators, the selected validating visual object, and a list of valid ticket tokens. In a reserved seating arrangement, the ticketing database has a data record associated with a show, as indicated by a show identifier, but each seat has a data record that has a unique show identifier and ticket token, which includes the identity of the seat itself.

In the preferred embodiment, the validating visual object is secured against tampering. One threat model is that a customer who has received a ticket payload would then take the data file comprising the ticket payload and analyze it to detect the actual program code that when executed, produces the validating visual object on the display screen of the device. Once that has been accomplished, the would-be pirate can then re-package the code without any security mechanism and readily distribute it to other device owners, or even cross-compile it to execute on other types of display devices. The preferred embodiment addresses this threat model in a number of ways.

First, the ticket payload can be secured in a region of the device under the control of the telecommunications provider. In this case, the customer cannot access the code comprising the ticket payload. In another embodiment, the ticket payload can be encrypted in such a way that the only decrypting key available is in the secure portion of the telecommunications device. In that embodiment, the key is only delivered when an application running on the secure part of the device confirms that the ticket payload that is executing has not been tampered with, for example, by checking the checksum of its run-time image. At that point, the key can be delivered to the ticket payload process so that the validating visual object is displayed on the device.

Second, the selected animation is packaged for each device. That is, the code that operates to display the validating visual object itself operates certain security protocols. The phone transmits a ticket transaction request. The request includes a numeric value unique to the device, for example, an IMEI number. Other embodiments use the UDID or hardware serial number of the device instead of or in combination with the IMEI number. The system server then generates the ticket token using the IMEI number and transmits that value to that device. In addition, the ticket payload is created such that it expects to read the correct IMEI number. This is accomplished by the system server changing portions of the ticket payload so that the it is customized for each individual IMEI number associated with a ticket token. The animation code comprising the ticket payload is designed so that it has to obtain the correct IMEI number at run time. In another embodiment, at run-time, the animation code will read the particular ticket token specific for the phone that instance of the animation was transmitted to. The code will then decode the token and check that it reflects the correct IMEI number for that device.

In another embodiment, the security protocol first requires the user to login to the server with a login username and password. The application also transmits the IMEI, UDID or serial number of the device or any combination of them. When verified by the server, an authorization key (Authkey) is transmitted to the device. The Authkey is a random number. When the user's application transmits a request for a validating visual object, it transmits the Authkey and the IMEI, UDID or serial number (or combination) that is used for verification. This is checked by the server for validity in the database. On verification, the validating visual object is encrypted using the Authkey and transmitted to the device. The application running on the device then uses the Authkey to decrypt and display the validating visual object. The Authkey is a one-time key. It is used once for each ticket payload. If a user buys a second ticket from the system, a different, second Authkey is associated with that second ticket payload. In one embodiment, the Authkey is unique to the ticket for a given event. In another embodiment, the Authkey is unique to the ticket, device and the event. In other embodiments, the Authkey can be replaced with a key-pair in an asymmetric encryption system. In that case, the validating visual object is encrypted with a "public" key, and then each user is issued a private key as the "Authkey" to be used to decrypt the object.

In yet another embodiment, the Authkey can be encrypted on the server and transmitted to the device in encrypted form. Only when the application is operating can the Authkey be decrypted with the appropriate key. In yet another embodiment, the application that displays the validating visual object can request a PIN number or some other login password from the user, such that if the device is lost, the tickets cannot be used by someone who finds the device.

In another embodiment, the application running on the device can fetch a dynamic script, meaning a piece of code that has instructions arranged in a different order for subsets of devices that request it. The ticket payload is then modified so as to have the same number of versions that are compatible with a corresponding variation in the dynamic script. As a result, it is difficult to reverse engineer the application because the application will be altered at run time and the ticket payload customized for that alteration. One embodiment of the dynamic script would be expressed in Java™ computer language and rendered using OpenView. The ticket payload can be an HTML file called using Ajax.

Security can also be enhanced by actively destroying the validating visual object so that it resides in the device for a limited time. In one embodiment, the ticket payload has a time to kill parameter that provides the application with a count-down time to destroy the validating visual object. In another embodiment, the validating visual object is displayed when the user holds down a literal or virtual button on the user interface of the device. When the button is released, the application destroys the validating visual object.

Security can also be enhanced by retaining as steganographic data embedded in the validating visual object, the IMEI, UDID, Serial number or phone number of the device. The application can be operated to recover that information and display it on the screen. This makes it possible for security personnel at a venue to view that information from a validly operating device. If the device is showing a pirated validating visual object, then the actual data associated with the device will not match and it will be apparent from inspection of the device. This way, suspicious ticket holders can be subject to increased scrutiny, the presence of which deters piracy.

In another embodiment, the ticket payload can operate a sound sampling application that requests the customer to speak in to the device. The application can then use that data to check whether the voice print of the speaker matches the expected voice print. In yet another embodiment, the device can take a picture of the customer's face, and then facial recognition code embedded in the ticket payload can operate to check whether the features of the face sufficiently match a pre-determined set of features, that is, of the customer's face at the time the ticket was purchased. In yet another embodiment, the verification can be supplemented by being sure that the use of the ticket is during a pre-determined period of time. In yet another embodiment, the verification can be supplemented by the ticket payload operating to check that the location of the venue where the ticket is being used is within a pre-determined range of tolerance to a GPS (Global Positioning System) location. In yet another embodiment, after a certain pre-determined number of downloads of ticket payloads for a specific show, the validating visual object is automatically changed. This last mechanism may be used for promotions, to select the first set of ticket buyers for special treatment at the venue. In yet another embodiment, two different validating visual objects may be used, which are selected based on the verified age of the customer. In this way, a venue can use the system to not only to verify ticket holders coming into the venue, but to verify their drinking age when alcoholic drinks are ordered.

Figure 12:
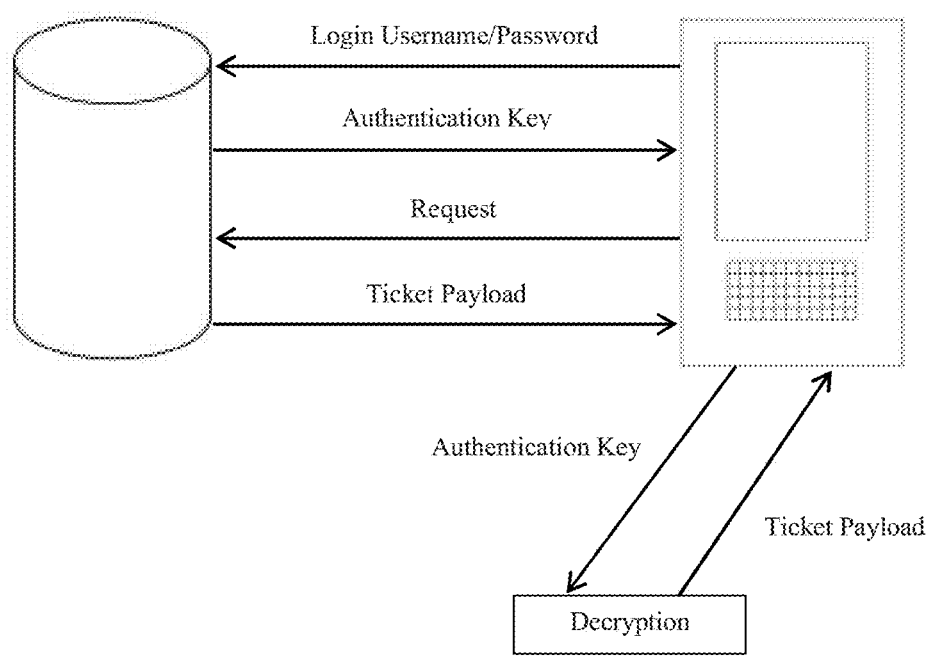
FIG. 12. Flowchart for ticket activation process.

In yet another embodiment, the system's servers control the ticket activation process. FIG. 12. In this embodiment, the token is generated randomly by the user's mobile computing device and then transmitted to and stored on the system server as a result of the user's request to activate the ticket. When the server receives a request to activate a ticket, the server checks whether there is already an activation token stored in its database that corresponds to that ticket. The token is stored in a data record associated with the user that is activating the ticket. The user logs into the account and then requests that a ticket be activated. If it is, then it checks whether the token received from the user's mobile device matches the stored token. That is, it authenticates against that stored token. If the user's request for activation is the first activation of the ticket, then the server stores the received token into the data record associated with the user's account and keeps it there for a predetermined period of time, in order to lock the ticket to that device for that period of time. This process locks a ticket to that unique token for that lock period. Typically this will lock the ticket to the user's mobile computing device. If the stored token does not match the token received from the user's computing device, the ticket activation is denied.

The predetermined lock time permits a reusable ticket to be locked to a device for the predetermined lock time. This is useful in the event the user changes the mobile computing device that the user uses to the ticket. For example, a monthly train commuting ticket would be activated once each day, and would remain activated for the day of its activation. In this case, the user would validate the ticket once each day, and that activation would be locked to the device for the day. The next day, the user would be able to activate the ticket using a different mobile computing device if the predetermined time locking the activation has expired, that is, if the data record associated with the ticket has been automatically reset into a deactivated state. The activation process also permits a user account to be shared within a family, for instance, but that each ticket sold to that account to be locked to one device.

Figure 13A:
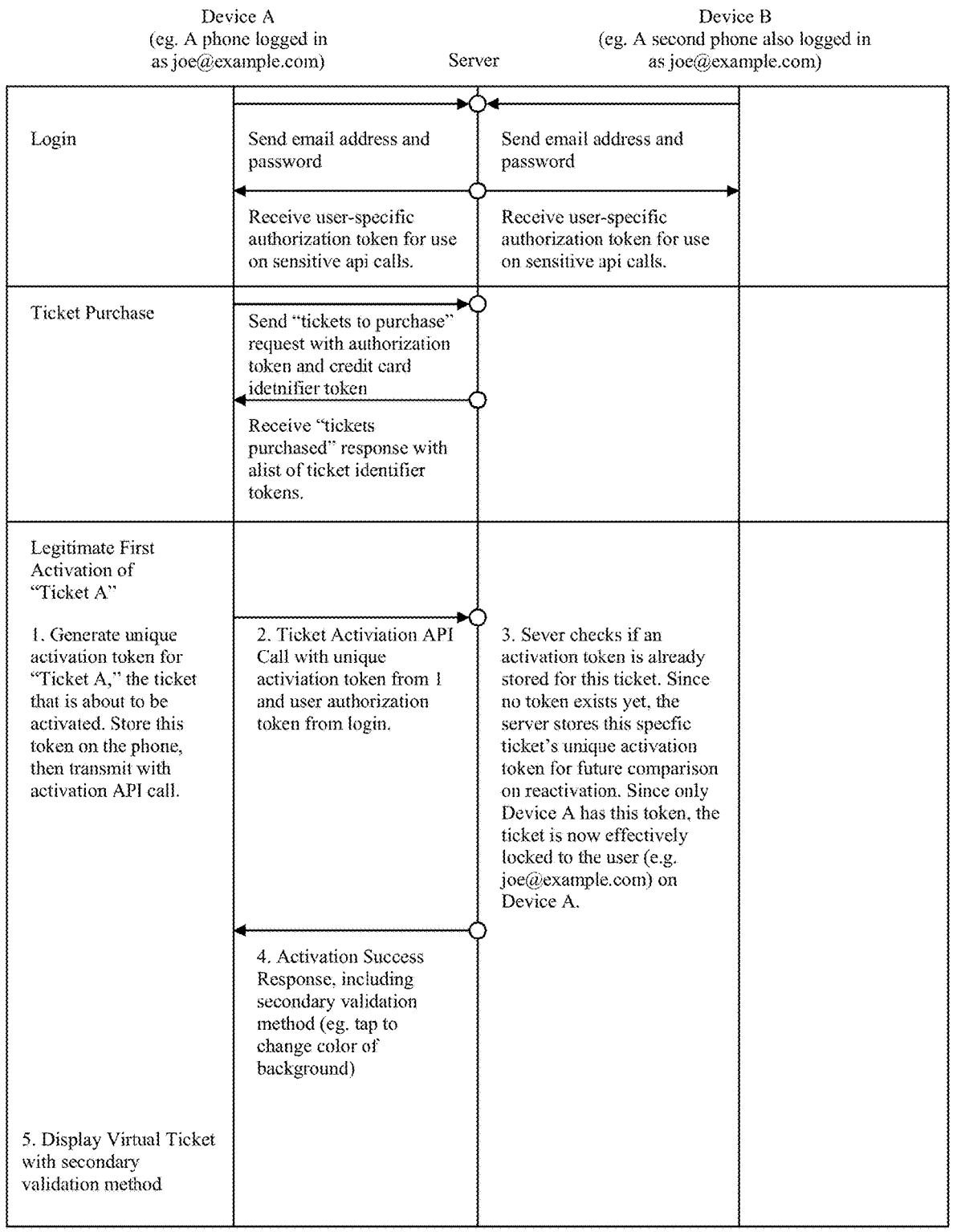
FIG. 13*a*. Protocol diagram for activation process.
Figure 13B:
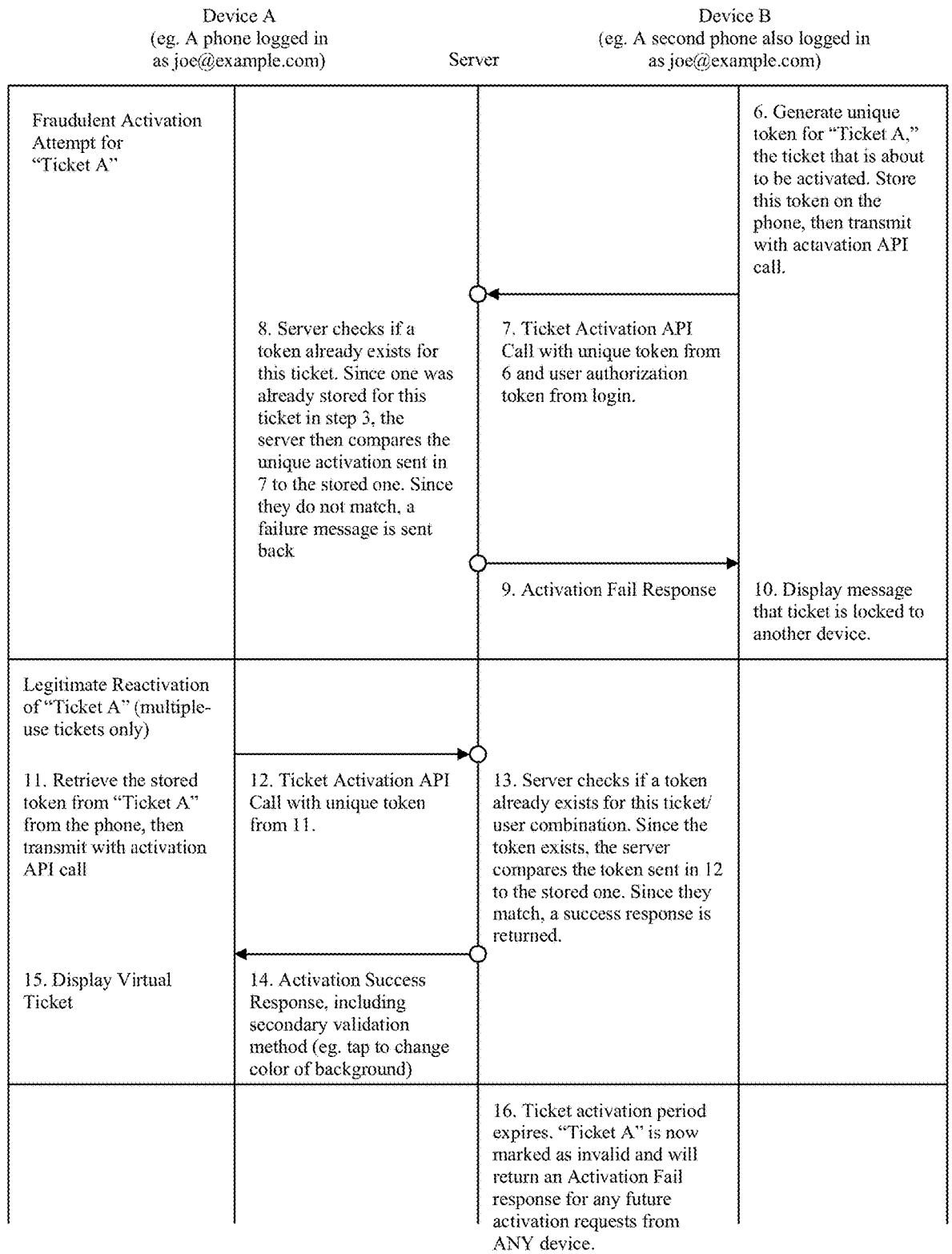
FIG. 13*b*. Continued protocol diagram for activation process.

As depicted in the protocol diagrams FIGS. 13a and 13b, the user can use their mobile computing device to request that their ticket get activated for the first time. However, once that activation process has occurred, the server will store the unique token received from the activating user's computing device in the database in a manner that associates it with the ticket and the user's account. If another user associated with the account attempts to use the ticket by activating it, a different random token will be transmitted to the server. Because these two tokens do not match, the second activation will be prohibited.

Third Party User, Device, and Ticket/Funds Management. The ability of a third party to manage, distribute, remove, or authorize tickets, passes, funds, or entry for a specific user device and/or user account combination are aspects of additional embodiments. In one embodiment, there are currently tools for user mobile device management for the purposes of managing the software that resides on a phone. There is also account management software that is used to associate tickets, passes, and funds to a user's account. In yet another embodiment, there can be multi-factor management that provides specific controls over the user account and device management which are combined for the management of tickets, passes and funds. In this embodiment, the management system can permit an authorized third party to manage the association of a user account with a device, or a ticket with a device. For example, if an employee that has employer sponsored tickets downloaded to their mobile device decides to replace the device with a new device, the employer can log into the system, bring up the portion of the user's account associated with the employer and then update the data record associated with the user that are related to the employer so that the existing purchased tickets become authorized for the new mobile device, while deactivated for the old device, in to prevent the old device from being able to utilize ticketing functionality.

In this embodiment, there is a computer system comprised of a management account and a user account. The management account is accessible by the ticket issuer. There may be many management accounts, given that the ticketing system may issue tickets for more than one location. In other words, there may be a management account for a sport venue and a management account for a subway system. The user accounts are associated with the user and the user's mobile device. When the user buys a ticket from a ticket issuer, the ticket issuer is provided the privilege of viewing and modifying the ticket data associated with the user's ticket from that ticket issuer. As a result of a user having a subway ticket and a sports venue ticket in their account, both the subway system and the venue have limited control of the user account portions associated with their respective tickets. Similarly, an employer that buys subway tickets for their employees may have limited control over the user's account portion associated with those purchased subway tickets. In other uses, the ticketing issuer can manage the transfer or sale of tickets from one user to another. In this scenario, the ticketing issuer has the authority to enter the management database and delete the ticket from the account of the transferor and input it into the account of the transferee. The transferee's device information is part of its account, so the new ticket is issued in accordance with the system requirements to bind that new ticket to the transferee's device.

Figure 19:
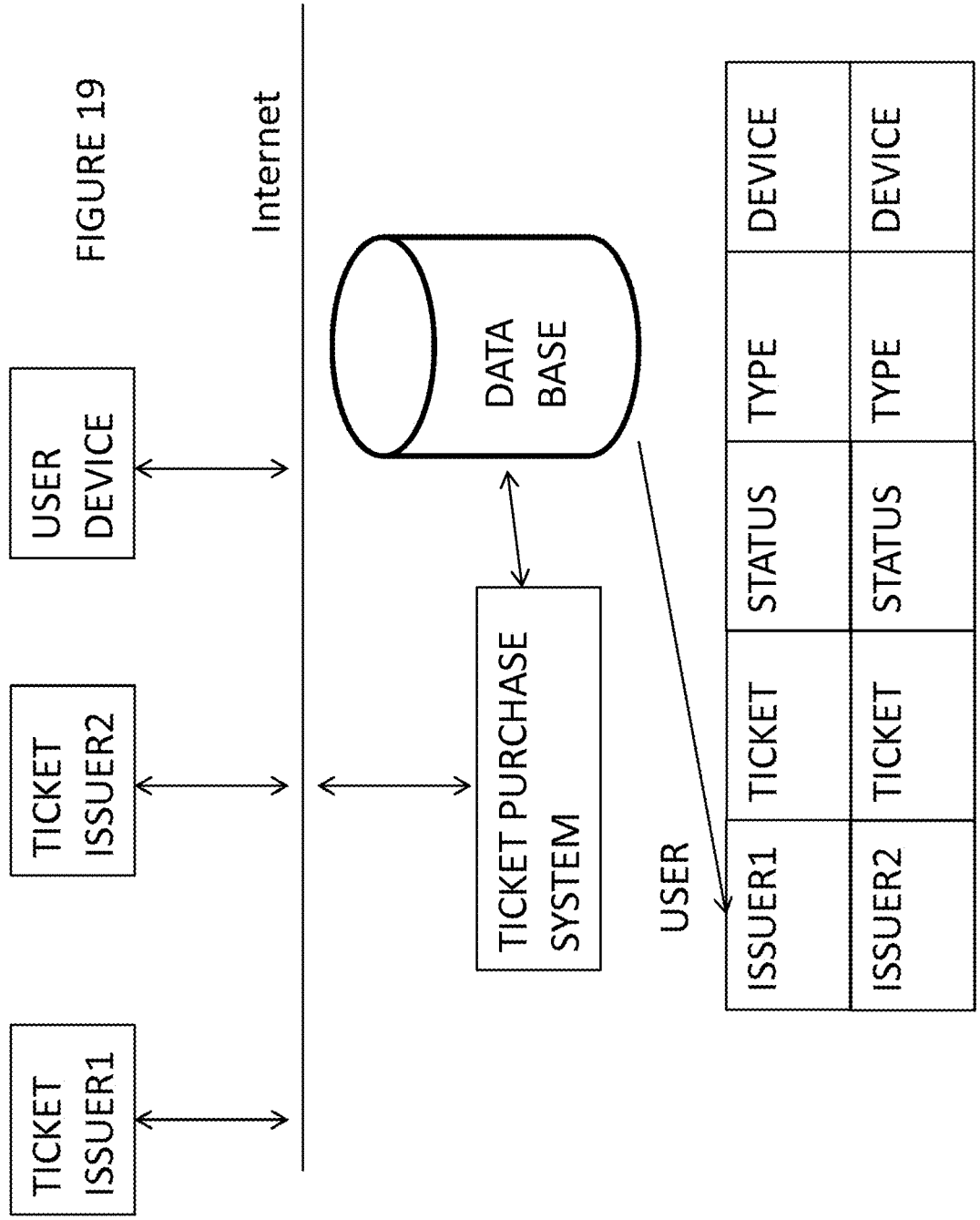
FIG. 19. Example for multiple ticket issuers
FIG. 20. Flow chart for identifying a potential fraud condition and sending an alert data message to a central server
FIG. 21. Flow chart for sending a data message alert from a central server to an authorized recipient
FIG. 22. Overview of anti-fraud system architecture
FIG. 23. Basic architecture

Referring to FIG. 19, the two ticket issuing entities have computer systems that are operatively connected to the ticket management system. That system is comprised of a database, which is further comprised of a data record associated with the user. The user may any number of tickets, but each ticket is associated with an issuer. A given ticket issuing entity can log into the ticket purchasing system and view all of the tickets it has issued or a subset based on a query, for example, all tickets for a particular event, or issued to a particular user or device. The ticket issuer is authorized by the ticket management system to only have the authority to view its own tickets and specific information related to the ticket. The system will shield the user's other ticket data or private information from the ticket issuer as appropriate. When the ticket issuer has finished modifying or managing the ticket entry, the ticket may then be issued to the user's device. Practitioners of ordinary skill will recognize that the embodiments of the database data records presented as a flat database file may also be equivalently expressed as a series of relational tables.

The activation process can also permit a ticket to be shared. In this embodiment, the user who has activated the ticket can submit to the server a request that the ticket be transferred to another user. For example, a data message can be transmitted from the user's device to the system that embodies a request to move the ticket to another user. In that case, the stored token is marked as blocked, or is equivalently considered not present. This is accomplished by storing a data flag in the database that corresponds to the ticket. One logic state encodes normal use and the opposite logic state encodes that the ticket has been shared. A data message may be transmitted to the second user indicating that the ticket is available for activation. The second user may submit a request to activate the ticket and a random token value is transmitted from the second user's device to the server. That second token value is checked to see if it's the first activation. Because the first user has activated the ticket, but then transferred it, the activation by the second user is not blocked. That is, the server detects that the first token is now cancelled or equivalently, the system has returned to the state where the first activation has not occurred and therefore permits the new activation to take place. The new activation can also have a predetermined time to live value stored in the database that is associated with it. In this case, the activation by the second user expires and the second user can be prevented from reactivating the ticket. At the same time, the flag setting that disables the first token can be reset, thereby setting the ticket up for reactivation by the first user. By this mechanism, it is possible for the electronic ticket to be lent from one user to another.

In yet another embodiment, the ticket activation process can open a persistent connection channel over the data network that links the server and the user's mobile computing device. In this embodiment, if the activation of the ticket and therefore the device is successful, the server can maintain a persistent data channel with a computer process running on the user's computing device. In this embodiment, the request for ticket activation causes the user computer device to open the persistent channel. In this embodiment, the server establishes a communication process operating on the server that receives data and then causes that data to be automatically routed to the user's computing device. The process on the user's mobile computing device can thereby automatically respond to that received data. In tandem, the computer process operating on the users computing device can send data directly to the server process associated with that user's session. For a server servicing many user devices, there will be one persistent channel established between the server and each mobile device that has an activated ticket.

The persistent channel between the server and the user's computer device can be used in a variety of ways. In the preferred embodiment, the persistent connection is designed so that that it maintains a bi-directional, full-duplex communications channel over a single TCP connection. The protocol provides a standardized way for the server to send content to the process operating on the user's computing device without being solicited by the user's device each time for that information, and allowing for messages to be passed back and forth while keeping the connection open. In this way a two-way (bi-direction) ongoing interaction can take place between a process operating on the user's computing device the server. By means of the persistent channel, the server can control the activity of the user computer device. For each user computing device, there can be a distinct persistent connection.

Figure 14:
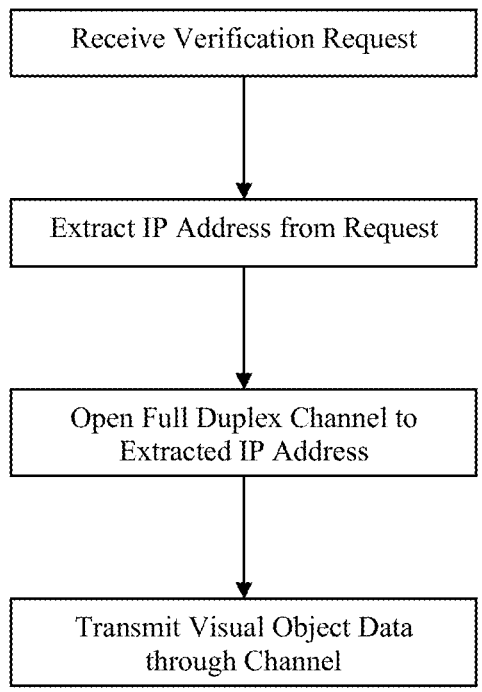
FIG. 14. Flowchart for persistent channel.

In one embodiment, the persistent connection is established when the user requests an activation of a ticket. See FIG. 14. In other embodiments, it can be used if the system is used to verify payment of a purchase price. In either case, the user computing device transmits a request message to the server. For each user computing device, there can be a distinct persistent channel. Each persistent channel has a label or channel name that can be used by the server to address the channel. In the case of ticketing, when the ticket is activated the data representing the validating visual object can be transmitted in real time from the server to the user computing device and immediately displayed on the device. This provides an additional method of securing the visual ticketing process. In this case, when the ticket is activated and the persistent channel is created, the label of the channel is stored in the database in a data record associated with the user and the ticket. When the server transmits the validating visual object for that ticket, it fetches from the database the label of the channel and then uses that label to route the transmission of the validating visual object. The use of the persistent channel causes the user computer device to immediately and automatically act on the validating visual object. In one embodiment, the receipt of the validating visual object causes the receiving process to immediately in response interpret the command and select and display the required visual pattern. In another embodiment, the process receives a block of code that the process calls on to execute, and that code causes the visual pattern to be displayed. In yet another embodiment, the process receives image or video data and the process passes that data on to the user device screen display functions for presentation on the user device screen.

In another embodiment, a validating visual object can be transmitted to the user's computing device to be automatically displayed on the screen without the user having to input a command to cause the display. That visual object can be displayed by the user computing device. For additional security, the server can transmit to the user computing device a visual object that contains the channel name or a unique number that the server can map to the channel name. For clarity, this additional visual object is not necessarily used for visual verification by ticket takers, as explained above. This visual object can be used by other machinery to confirm the ticket purchase transaction or even other transactions not directly related to the purchase of the ticket. The additional visual object can be in the form of a QR code, barcode or any other visual object that can be scanned, for example at a point of sale system, and from that scanned image, an embedded data payload extracted. In that visual object, data can be embedded that uniquely identifies the source of the scanned object. The channel name of the persistent channel or a number uniquely mapped on the server to identify the channel can be embedded in that scanned object.

Figure 15:
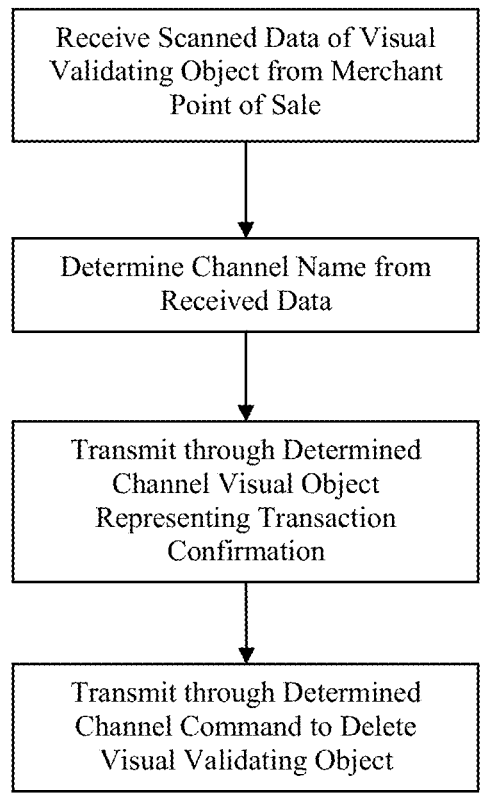
FIG. 15. Flowchart for persistent channel for purchase verification.

In one embodiment, as shown on FIG. 15, a merchant can use a point of sale system operated by the merchant to scan the display screen of the user's computing device. That point of sale system can then capture from the scanned image the channel name or a unique number that is uniquely mapped on the server to the channel name. That information is transmitted to the server as a challenge for verification. The received challenge data is checked to see if it matches the channel name or corresponding unique number used to transmit the visual object that the merchant scanned. If they match up, there is a verification of a transaction. This exchange provides verification that the user's device is present at the merchant location and that a transaction with the merchant should be paid for.

In yet another embodiment, the persistent connection provides a means for the server to control the actions of the process operating on the user's computer device that is at the other end of the connection. In this embodiment, the server can automatically transmit a command to the process on the user's computing device that automatically deletes the verifying visual object that has been transmitted to ensure that it cannot be reused or copied.

In one embodiment, the persistent connection is used to automatically transmit visual information to the user's mobile computing device and to cause that information to be displayed on the screen of the device. The visual information can be the validating visual object or any other visual object that the server selects to transmit for display. In this embodiment, the persistent connection can be used by the server to transmit other information to the user's device. In this embodiment, the server transmits text, images, video or sound and in some cases in combination with other HTML data. In another embodiment, this material comprises advertising that the server selects to display on the user's device. The selection process can utilize the GPS feature described above to determine the approximate location of the user's device and then based on that location, select advertising appropriate to be transmitted to that device. In yet another embodiment, the server selects the advertising content by determining predetermined features of the validated ticket or purchasing transaction and then making a selection on the basis of those features. For example, a validation of a ticket to a baseball game played by a team specified in the data associated with the validated ticket may cause the selection of an offer to purchase a ticket for the next baseball game of the same team. In yet another embodiment, the character of the transaction being verified can be used to cause the selection of advertising or the transmission of data comprising a discount offer related to the transaction.

In this embodiment, the server receives from the merchant the data that determines the persistent channel. The merchant, by relying on the system for payment will also transmit transaction details, for example, an amount of money and an identity of goods or services. When the channel name or unique number associated with the channel is matched for verification, the server can transmit data representing a confirmation display down to the user's device using the persistent connection. This data is received by the user computing device and then automatically rendered by the process at the other end of the channel connection. In addition, the server can use the transaction information to determine one or more advertisements or discount offers to transmit to the user's computing device. The selection method can consist of one or more heuristics. In one example, the validation of the ticket for a baseball game can trigger the display of advertising for food or drinks. Likewise, a transaction for purchasing a cup of coffee can trigger an advertisement for purchasing a newspaper.

Proximity Detection for Entry Validation

In another embodiment, the invention is directed to a system that determines ticket validity based on a proximity analysis algorithm that the mobile phone on the consumer has a valid pass for entry into a venue, event or mode of transport, and that the person has a valid entry pass to go through the turnstile or other entry port mechanism. This process occurs without the need to present the cell phone and without the need for the mobile device owner to do anything at the point of entry other than to have the device turned on with Bluetooth LE turned on. The key here is the differentiation of enhanced proximity awareness along with user/account/device validation communications that occurs around the use of mobile electronic ticketing processes for entry or exit.

The system is comprised of two or more bluetooth le or other wireless proximity sensors, e.g. antennas, used to determine shared proximity. Shared proximity means that the data from all the sensors indicates that the same mobile device is present at a pre-determined location relative to the predetermined locations of the sensors, for example, the center of the turnstile. The detection data from the proximity detecting antennas is transmitted to a computer that uses the data to determine the exact location of the mobile device. This works similar to triangulation, but the amount of sensors is not necessarily limited to three sensors. By placing proximity sensors at and around a turnstile, a user can be validated as a legitimate pass/ticket holder without the need to scan a piece of paper or present the phone to a ticket taker or barcode reading device.

The algorithm requires the sensors to communicate with one another either locally or communicate with a server to determine whether the ticket holder meets the required criteria for a valid pass holder. The multiple sensors allow for ticketed passengers to enter into a virtual box to determine exact perimeters and centralization of the phone to make sure the person with the valid pass/ticket is the actual person about to enter the gate. Different ways of calculating or determining location may be used. In one case, the sensors determine approximate distance of the same mobile device. Geometric calculations based on the predetermined location of the sensors will result in the location of the mobile device. In another embodiment, the sensor sensitivity profile may have a shape that results in a signal of a certain set of strengths at all corresponding sensors that only occurs when the mobile device is at a predetermined location relative to the sensors. A third methodology is to combine location detection methods. For example, a light beam or ultrasonic sensor may be tripped to indicate that a person is within the box. At that instant, the sensor may be only one antenna with such a low sensitivity that it only captures the signal from a device located in the box. The system then determines that the mobile device so detected is the one in the box.

As a further iteration of this concept, the phone as part of the validation process can determine whether the device has more than one valid ticket associated with it and allow for multiple entries if there are multiple tickets available and set for use on the mobile device.

In another embodiment, Bluetooth LE, wireless proximity analysis, GPS and geo-fencing are used as a form of secondary validation for entry verification. The primary validation methods can include human-based visual validation of a ticket or pass, automated license plate reading, fingerprint scanning, facial recognition, or a unique alphanumeric ID entry via a keyboard or numeric keypad (telephone number generally) as the means of primary ID and the cell phone via Bluetooth LE, wireless proximity analysis, GPS or geofencing validates the individual and the account for the purposes of entry. This can be for toll roads, turnstiles, building security, gym memberships and other venue entry.

For the purposes of parking, in-car payment verification, restaurant payment validation and ticket validation, a phone using wireless token/key exchange to indicate a successful payment has been completed or that a valid ticket has been activated. This token exchange can occur via NFC, Bluetooth, WiFi or any other radio frequency transmission integrated into the light system. If a valid payment or ticket activation has occurred on the mobile device, the user will be issued a key/token that will allow them to turn a light on at the seat, car or table or indicate on another device display that the validation has occurred (or alternatively, has not occurred). For example:

If a person uses a cellphone to pay for a bill at a restaurant, the device receives a key that allows person to activate a light at the table. The light could be green (could be any color) to indicate a valid payment has been completed.

Another example is that a person sitting on a train or other transit can use the local ticket verification to actuate a light embedded into the seat in front. The person is able to activate the light using the encrypted key transmitted to the phone, which is then locally transmitted to a device controlling the light. When the ticket taker walks through the train car, he does not need to stop at the seats where there is an active light because that ticket holder has already been activated.

The invention can also be applied to visually impaired persons. A person who is visually impaired would have the capability to get onto a bus, train, or boat and they would receive a vibration or noise on their mobile device to indicate that their ticket has been validated and that they have valid entry. A similar concept can be added for handicap access into transit systems where there are special service doors for disabled passengers to enter and exit a transit system.

Figure 16:
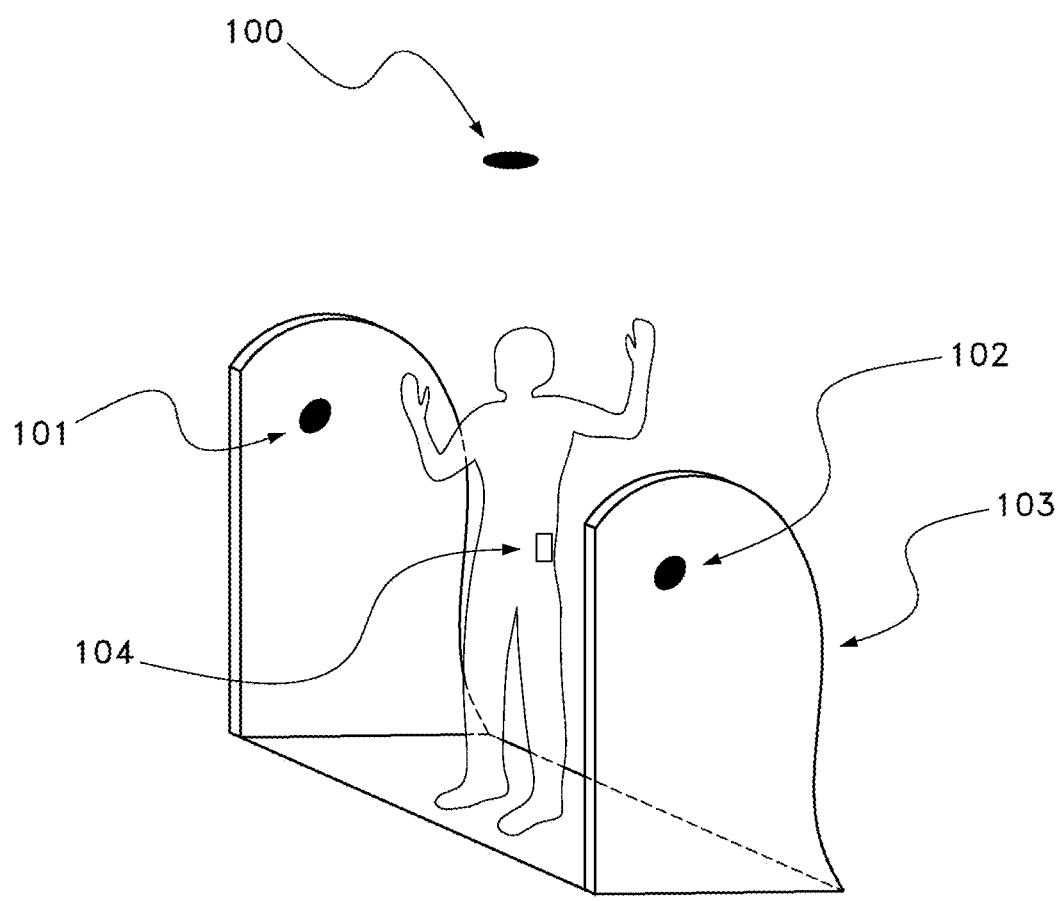
FIG. 16. Example turnstile deployment.
Figure 17:
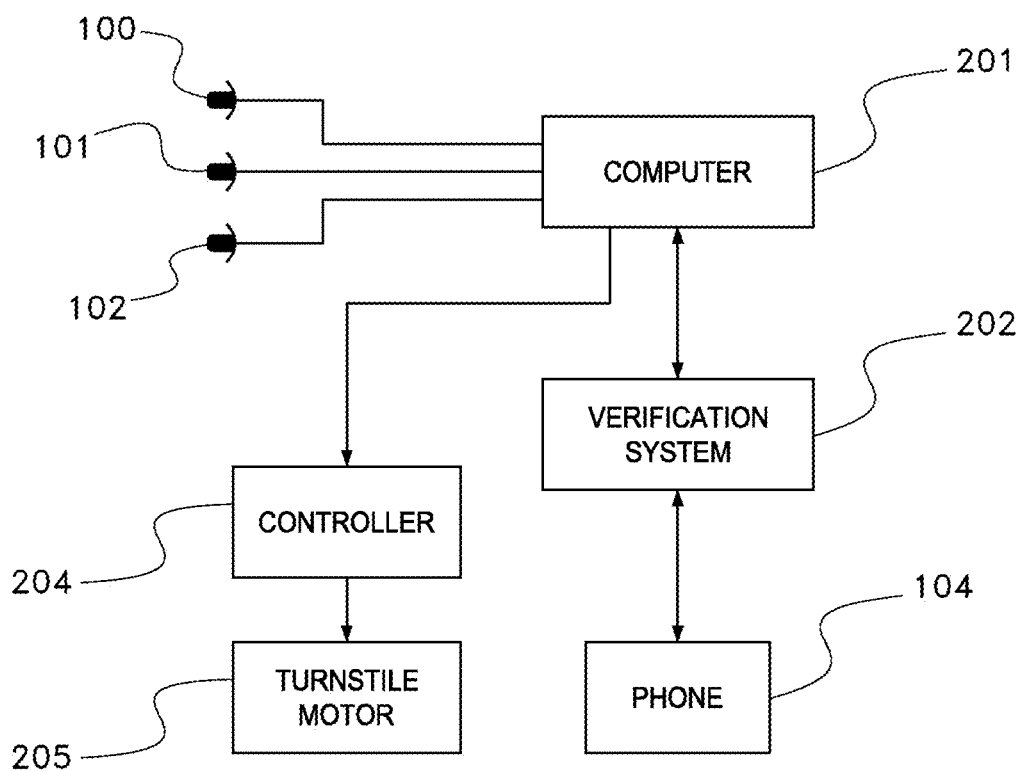
FIG. 17. Example system architecture.
Figure 18:
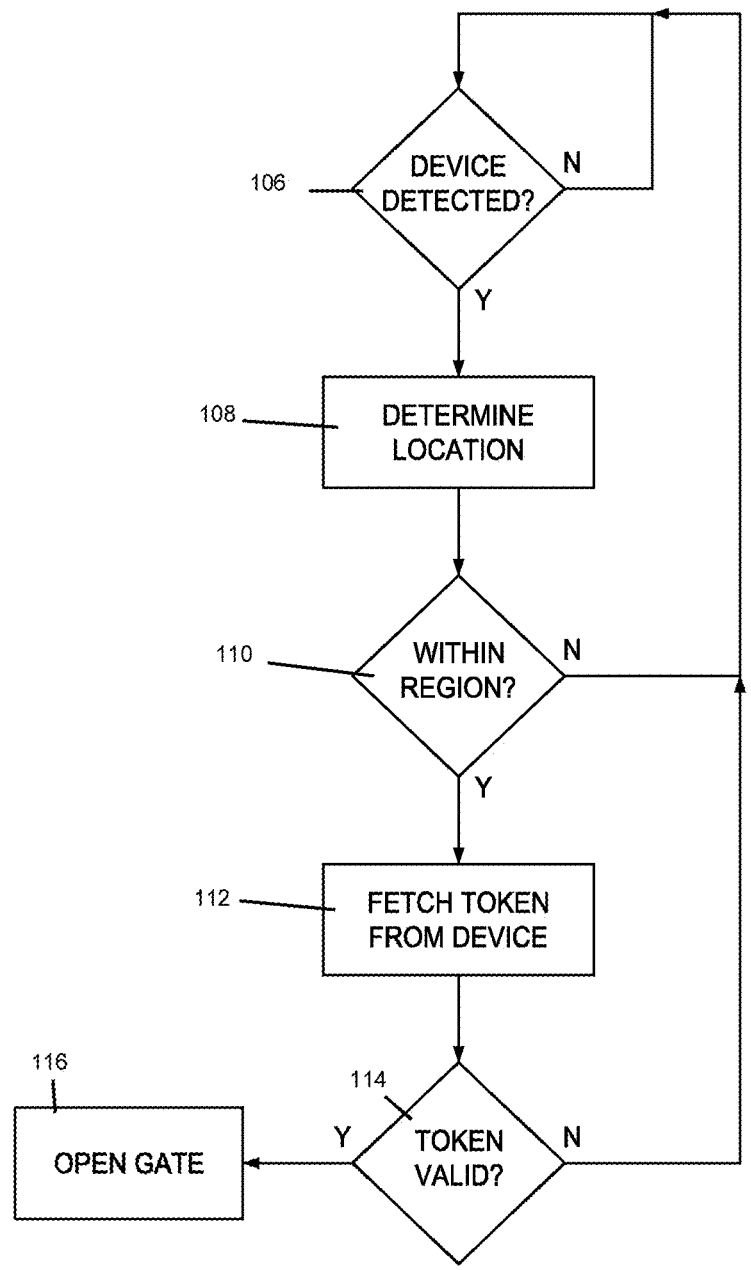
FIG. 18. Flowchart for proximity detection and validation.

Referring to FIG. 16, the sensor antennas, 100, 101 and 102 are situated in order to be able to detect that the person's mobile device 104, is located within the turnstile, 104. Referring to FIG. 17, the antennas, 100, 101, 102 are operatively connected to a computer device, which may be a system of several computers that further transmit data, but in any case a system that can use the data received to determine the location. The computer system is operatively connected to the mobile ticketing verification system 202. That system interacts with the mobile phone, 104, in order to provide it a token or otherwise verify that the phone is associated with a valid ticket for the turnstile. Upon validation, the computer device 201, sends a command to a turnstile controller 204, which actuates the turnstile motor, 205. Referring to FIG. 18, the flow chart shows the sequence of logic that may be used in one embodiment. Practitioners of ordinary skill will recognize that the specific sequence depicted is not limiting because ticket verification could precede location confirmation, for example.

Reusable Luggage Tags, Shipment Labels, Lanyards, Cards or Tickets

The mobile ticketing system and method may be further enhanced in connection with a physical token. For example, the system can create a single component or any combination of electronically created visually validated luggage tags, lanyards, cards (business, payment, gym membership, etc.), physical tickets, or shipping labels along with a bar code, NFC/RFID, or Bluetooth that allows for a shipment or luggage tag to constantly be reused. A luggage tag or reusable shipment label would have a unique hardware identifier associated with it, for example, an NFC, RFID, UDID, Bluetooth ID that is built into the tag itself, that would allow for it to be managed with a users account similar to how a mobile device is locked to a users account. In other words, the user's account would be bound to one or more of the identifiers that are embedded in the tag itself. The luggage tag or shipment label would contain the obvious information of the destination of the shipment or luggage, but if everything fails, since the unique identifying hardware in the tag is associated with a user account, the destination can also be determined by looking up the details of a user account. A luggage tag or reusable shipment label could also have a direct Internet connection in and of itself so that it may be searched for electronically. In the preferred embodiment, the luggage tag or reusable shipment label would be locked to a specific mobile device and user account combination that would generate a unique public/private key combination to encode and decode the details associated with the luggage tag or shipment label. Because the shipping carrier, airline, ferry operator, etc. would need to be able to decode the shipping details, they would have a public key that gives them access to read the details of the origin, destination, shipment details, prioritization, etc. Other private information would remain inaccessible. The concept of visually validated luggage tag and shipments components is also part of the system. In one embodiment, the hardware tag may itself have a modifiable visual output, which could include one or more lights or a display screen. When the tag receives a query, it can display its status. In one embodiment, luggage sorting personnel can transmit to a set of luggage a request to see a status, for example seniority. The device can either have stored within it its status code, which it then displays, or it can query a remote server for the status code by transmitting its hardware identifier, which is used by the system to match the tag to the user and from the user's account their status. This information is returned to the tag, which then displays the appropriate visual validation object. Because the validation object can be changed, it is not possible to cheat the system by having a hard-wired tag that always displays the same status indictor. The same process can be accomplished with packages that being shipped. In yet another embodiment, the tag can be loaded with the appropriate status value so that the status value can be transmitted from the tag to a local server that then validates that specific tag and then returns the visual validation display object. In addition, the system can be used to verify that someone holding that luggage is associated with the user's account. As an example embodiment, consider an airline "platinum" level traveler whose luggage has priority over other luggage being handled by the carrier. The details about the traveler's status are conveyed to the luggage tag, which in turn has a LED lighting system built into so as to indicate that the luggage is priority. The light remains activated until the system confirms pickup at the destination. Further, the luggage tag can be a certain color, animation, or light flashing combination (two quick flashes of blue over and over again as an example) to indicate that the traveler's mobile device has been detected to be proximate to the luggage tag. This permits airport security to check and verify that people have picked up their own proper luggage and not someone else's, without specifically examining traveler documents or matching luggage tag numbers. There would be no need to do further validation because the color, animation, flashing combination would indicate to the bag/ID checker that this person has already synced up the luggage tag with their mobile device and therefore they are free to go on their way. This system can be further extended the BluetoothLE/iBeacons system because luggage tags or shipment labels can become certain colors, animations, or flashing combinations based on where the luggage or shipment is at, whether it is close to a carrier iBeacon or whether it is close to the end users authorized mobile device. By use of proximity detection there is no need for the user to pull their phone out of their pocket or open an app to change the LED color combination on the luggage tag or shipment label because it automatically knows from location detection that the traveler associated with the luggage or package is sufficiently close and therefore the package is getting picked up at the destination and it can change colors.

Any of these physical tags or labels may be used in a variety of applications. For example, any physical card media that someone carries regardless of purpose (business ID, credit card, frequent visitor, gym membership, etc.) and physical tickets. The reusable physical media that integrates with the mobile device and can therefore be constantly changing based on instructions from the mobile device or other Bluetooth based data being transmitted. The concept of a constantly reusable physical tag that is integrated with a mobile device would save time, money and materials because tags are still used in a variety of circumstances ranging from luggage tags to attendee tags at venues where access is limited to the appropriate ticket type. In this embodiment, the physical media has a display format that requires it to sync up with a mobile device in order for the data information, colors, animation, light flashing, etc. to be updated, validated or modified in some form or fashion.

In yet another embodiment, the tag may be comprised of a thin touch screen or other physical input device that allows for changing the type or data of the card presented as a result of touching it. An example embodiment works as follows: the user possesses a universal card that is synchronized with their mobile device. That card can function as a number of different payment cards, IDs, frequent member card, etc. The synchronization allows for minimal encrypted information to be stored on the card. If the user goes to one store and decides to use a Mastercard™ the touch screen of the card allows the user to swipe through while presenting that credit card number into the reader. Different selections of credit card number may be presented on the same physical card. The various cards available on the card are those that are authorized for the mobile device associated with the card without the need to present the mobile device. In addition, the card could be used for things other than credit card reading, for example, where a card insertion and verification unlocks a door. In any of these cases, the physical card would be verified to be associated with the mobile device, and controlled by the mobile device, but without the mobile device itself being presented. In another embodiment, a traditional card reader can be used in combination with a fob or other device associated with the mobile device where the fob is slid through a traditional credit card reader in order for data to be captured and passed up for payment verification. In one embodiment, the system would use LoopPay™. That data process can also be used to activate the system to update the user's account.

There is a need to track the copying of barcodes or visual validation objects in efforts to prevent fraud or re-use of an electronic ticket. One method of ticket fraud prevention is by monitoring the operation of the user's computing device when a certain condition is met such as the ticket application is running on the user's device, or the ticket is open on the user's device, or when the visual validation object is being displayed on the user's computing device.

Figure 20:
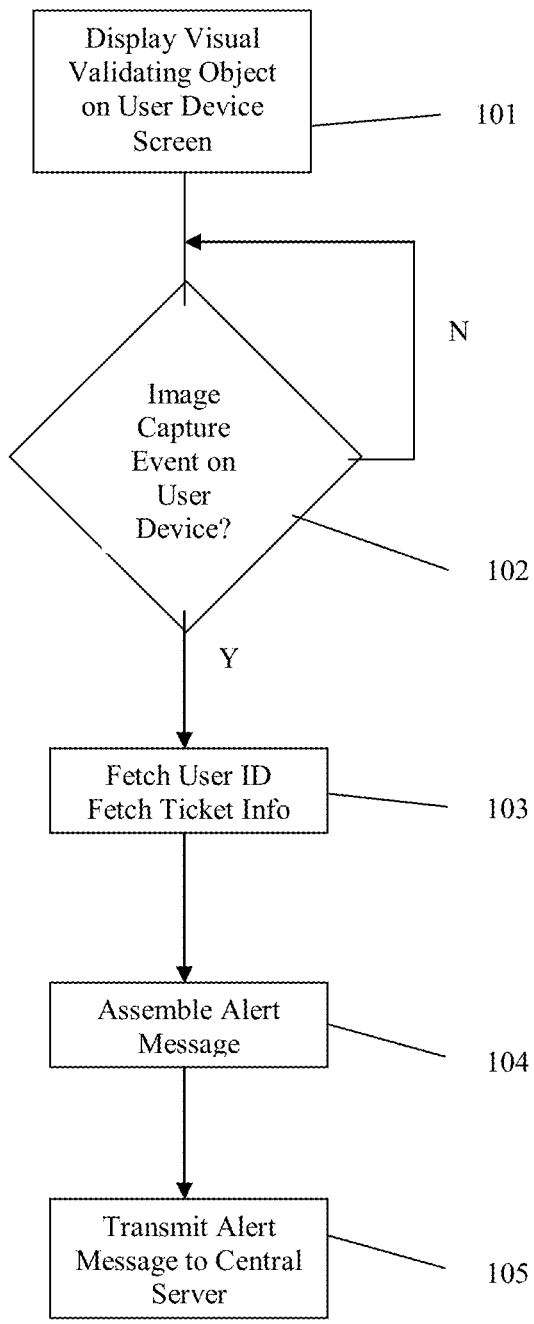

In one embodiment, the monitoring feature runs any time the mobile ticketing application is running on the user's computing device or whenever the visual validating object is being displayed on the device. When the monitoring system is activated, the system will monitor the user's device to check for the condition when the user captures an image of the displayed visual validating object, or captures a video clip the visual validating object's animation, or captures some other image of the application's interface. If the monitoring system detects that condition, it logs the activity and sends an alert data message over the data network, which the user's device is part of, to a central server. Alternatively, the mobile ticketing application can store the message in the user's device memory and wait for the condition when user device to become connected and upon such condition, transmit the message. In one embodiment, see FIG. 20, the monitoring system is activated while the ticketing application is displaying the ticket on the user's computing device (101) and logs an event whenever a mechanism to capture an image or video clip of the user's computing device is activated (102). If this condition (102) is met, then the system will fetch the ticket identification number and related information that is stored on the user's device (102), assemble an alert data message (104) describing the event occurrence, and transmit that alert data message (105) to the central server operating the ticketing service. In another embodiment, the alert data message is transmitted directly to the venue associated with the ticket.

The monitoring system may identify and log various identifying information, including the user identification number, computing device identification number, the user or computing device's location information, the ticket serial number, the security token associated with the ticket, the event identification, the venue identification number, or any other unique code, number, or image that identifies the user, the user's device, the ticket, the corresponding venue, or event, or any other data that the application has access to. In one embodiment, the monitoring system will log which element of the application user interface was displayed on the user's computing device at the time the image or video capturing event occurred.

Figure 21:
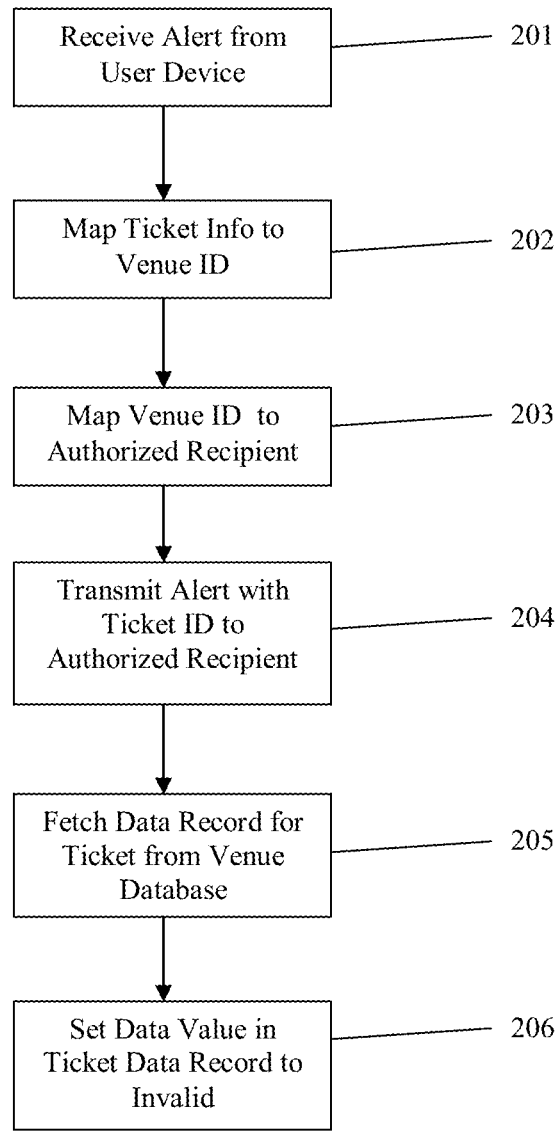

The alert sent to the central server may include any or all identifying information logged or any other data that the monitoring system has logged in association with the capturing event. In one embodiment, see FIG. 21, the system receives an alert message (201) and then retrieves from a database at the central server at least one recipient authorized to receive an alert that a given ticket is compromised or copied. The ticket identifier may be used to determine the relevant venue (202), and the venue identifier used to retrieve the relevant recipient (203). That way, the alert data message is ultimately routed to the appropriate recipient at the relevant venue. Once the central server receives the alert, it can detect the unique identification numbers associated with the ticket, user, event, or venue, and any other data the system logged, and transmit an alert to the authorized recipients (204). The authorized recipient at the venue, upon receiving the alert, has various action options, including logging and thereby storing the alert or activity in the venue's databases, or, in another embodiment, updating the venue ticketing database to indicate that the ticket identifier associated with the capture event is invalidated in order that the ticket not be used, disabling the user's membership or account, or transmitting a communication to the computer device at issue, the device owner, or the ticket purchaser or holder. The authorized recipients may also choose to share the activity information with others, such as other vendors, other event spaces, relevant authorities, or parties.

In one embodiment the authorized recipient is the venue for the ticketed event, and upon receiving the alert from the central server, the venue can take an action. Actions taken in response to a monitoring system alert may include logging the activity for a particular user (205), tracking and storing this activity in the user's venue account, and logging information on for a particular ticket such as setting the ticket value as "invalid," (206) or sharing the alert information with other vendors, other event spaces, relevant authorities, or other parties. In one embodiment, the vendor can update the ticket database to identify the unique ticket at issue as void or invalid for fraud. In another embodiment, the application operating on the user device can fetch the appropriate venue authorized recipient information from the central server and transmit the alert to the venue directly. In another embodiment, the data payload comprising the visual validation object will contain information indicating the proper destination for the fraud alert message and the application operating on the user device will extract that information and transmit the message directly to that location.

In yet another embodiment, the vendor may also send instructions over a data network to the application and monitoring system, instructing the system to re-issue new visual validation objects for all event tickets, or to re-issue a new unique ticket to the user who was flagged for potential fraud. Vendors may configure the system to operate a re-issue functionality feature to either remedy improper ticket cancellations and prevent future use of copied tickets or visual validation objects, or to ameliorate harsh results for a ticket holder that violated the ticket policy for the first time or accidentally. In one embodiment, a vendor may ameliorate the harsh result of complete ticket invalidation by re-issuing a new ticket to a user whose previous ticket was invalidated, coupled with transmitting a message to the user's device for display or playback reciting instructions or a warning that copying the ticket or visual validation object is strictly prohibited and may result in cancellation.

In another embodiment, the mobile ticketing application, event venue, or ticket issuer may establish a standard or formula for determining when to invalidate a ticket or cancel a user's account. For example, the mobile ticketing application, event venue, or ticket issuer may establish a "three strikes" standard, where third time offenders of the ticketing policies have their accounts cancelled. In this embodiment, the logging data embedded in the alert message is stored in the vendor's database so that the ticket status may be changed from valid to invalid when the conditions that the standard dictate are triggered. Other mobile ticketing applications, event venue, or ticket issuer may establish a one-strike policy, cancelling tickets or accounts upon a single event of ticket fraud. The mobile ticketing application, event venue, or ticket issuer may also create a "black list" database of prior offenders of the anti-fraud ticket policies. In this case, the ticketing server is configured so that if the same user purchases another ticket for the same venue or the same event, the ticketing server prohibits the transaction. In yet another embodiment, this penalty may expire after a pre-determined period of time. Therefore, in these embodiments, the entire transaction with the user that has triggered the process is logged and stored in a database so that the ticketing system can properly determine whether to issue a newly purchased ticket to the individual after a predetermined period of time from the detected capture event has occurred. Prior offenders may be subject to certain use limitations, such as a cap on ticket purchases per event, or may be subject to higher membership costs or ticket costs.

In another embodiment, the system sends an alert directly to the user's computer device or application account or associated account contact addresses, whenever a ticket fraud event is triggered. The alert may include messages to the application user or device owner, or instructions directly to the computing device. In one embodiment, the system sends a message to the user informing that the ticket is being invalidated for fraud. In another embodiment, the message alerts the user with a warning that distribution of the ticket or visual validation object is prohibited and will result in invalidation of the ticket, and/or other negative ramifications, such as deletion of the user's application account. In another embodiment, the system, upon receiving an alert that a triggering condition was met, will send instructions directly to the user's computing device to delete or otherwise destroy the data object comprising the visual validation object. In yet another embodiment, the systems may instruct the computing device to block the image/video capture functions when the mobile ticketing application is running.

The alert process has been described where the ticketing service is distinct from the venue's ticket checking system. In other embodiments, these may be combined. For example, the alert message is received by the ticketing service server, and that sub-system maintains the ticket database. Therefore, the invalidation occurs as an update to a data record on that sub-system. The ticket validation process at the venue occurs using interaction between the venue's ticket scanning systems and the ticketing server.

Figure 22:
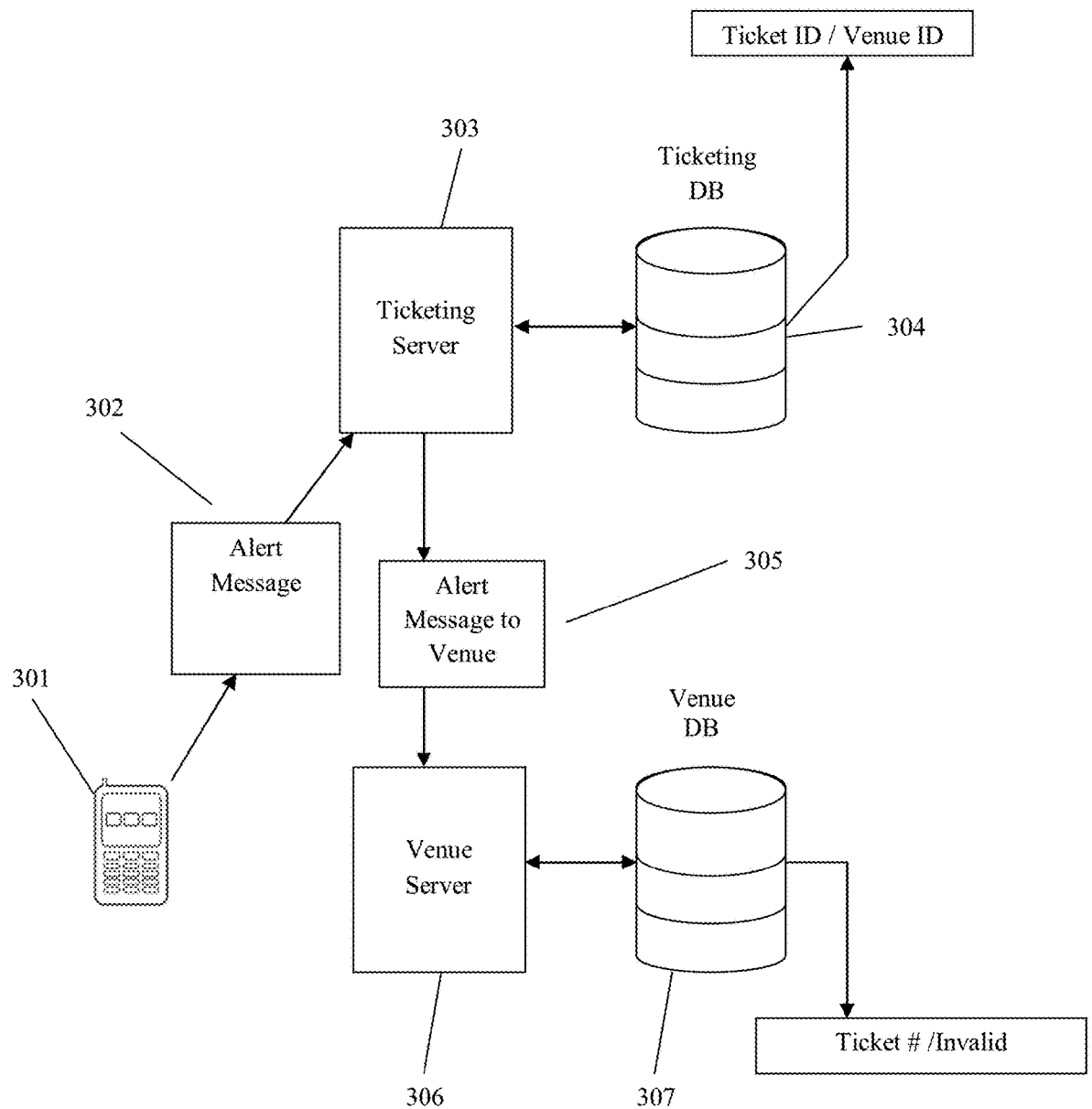

FIG. 22 presents an overview of the system architecture in one embodiment. A user's computing device (301) runs a mobile ticketing application that monitors the user's device for ticket fraud activities like capture of the display of a visual validation object. When the monitoring system detects such an event, such as an image capture of the mobile ticket or visual validation object, the system sends an alert data message (302) to a central server (303). The central server (303) stores the event log along with identifying information in a database (304)). The system can send a message (305) from the central server (303) to an authorized recipient, associated with the venue (306) that the ticket provides admission to, notifying the venue of the capture event and potential ticket fraud occurrence. The venue (306) can then store relevant identifying information and log the event in the venue's database (307). In addition, the venue's ticket database can be updated so that the validity state of the data structure associated with the ticket identifier associated with capture event is updated to indicate an invalid state. The venue's ticketing systems can be configured so that if a visual validation display object is detected and a ticket identifier thereby derived, that ticket identifier is checked against the venue's database for ticket validity. If the ticket subject to the capture event is presented at the venue, the validity indicated to the ticket taker shall be "void" or "fraud" or "invalid" and the person will not be admitted into the venue.

The monitoring system can detect the condition that there has been or may be an image capture or video clip capture in several ways. In one embodiment, the application running on the user device traps on the condition that a button or other user interface actuation that is known to cause image or video capture. This may be by polling or interrupt, and the routine launched upon such trap causes the execution of the alert process described herein. In another embodiment, the application monitors what processes are running on the device at the same time as the ticketing application itself. Some processes may be known by their name as an image capture or video capture tool. The application will then poll the running process table on the user device and test whether any of the process names in the table match the names that the application maintains in memory as a list as suspect processes. When it detects such a name, this may also be treated logically as the condition that the user is attempting to capture the image or video clip of the visual validation object.

The application can also address the situation where the name of the suspect process is obscured in some way or has been randomly created at install of the suspect process so that the name matching technique does not work. In this case, the application can check for each running process listed in the process table, and using the process table, locate where the process executable code is located based on the address pointer in the table. The application can then inspect the data content of some or all of the memory locations in the address block associated the running process to see if this data matches known suspect processes. In one embodiment, the application can run a checksum on a predetermined first number of addresses of the executable and then check in its database whether the checksum matches with the checksum of known suspect processes. This can also be considered the logical condition triggering the alert. The application can run this checksum once and maintain its own list of local process names and its determination whether the process can be used to capture an image or video clip of the visual validation object. That is, the application checks the user device environment once to see if any programs that are installed on the device could be used to perform the image or video clip capture. The presence of that condition on the phone may not be enough to trigger an alert, but the application can maintain its own process list so that it can automatically determine if one of such programs is running at the same time as the application itself. This latter condition is the logical condition that triggers the alert.

Figure 23:
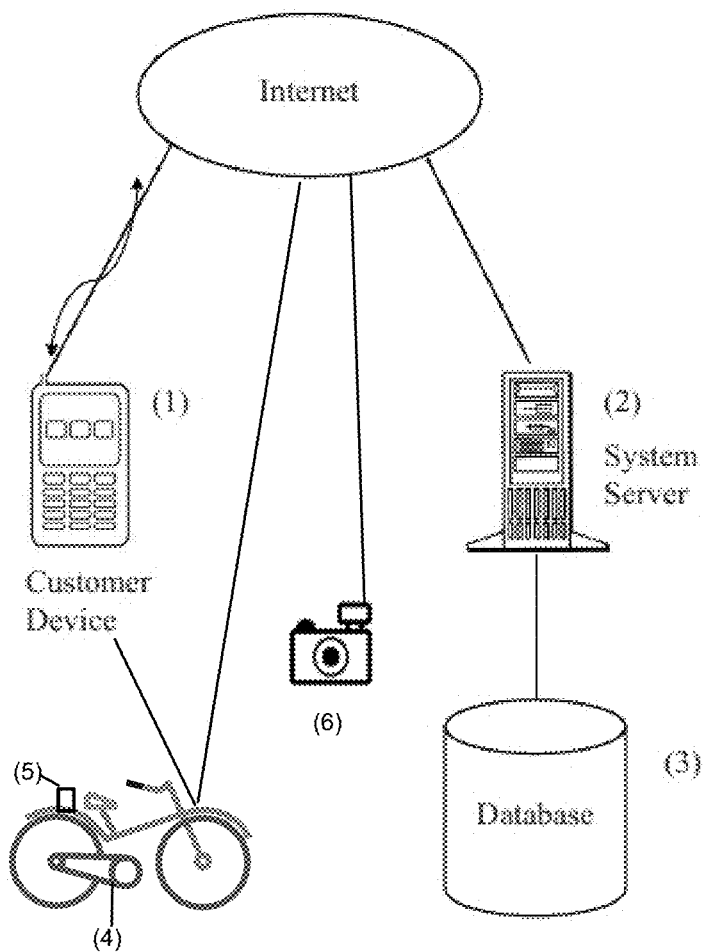

According to present invention, a method by a server system for obtaining visual validation of the possession of a purchased electronic ticket and previous payment for an additional item on a user's computer device for presentation to a ticket taker is provided. The method may comprise the steps of receiving from the user's computer device a request to verify purchase of a previously purchased electronic ticket and to obtain a visual validation display object that confirms that the user possesses the previously purchased electronic ticket and has previously paid for at least one additional item for utilization of a service monitored by the ticket taker, the visual validation display object configured to be readily recognizable visually by the ticket taker. As shown in FIG. 23, the at least one addition item may be, for example, luggage, suitcase, briefcase, bicycle (4), musical instrument, wheelchair, car, vehicle, motorcycle, automobile. There may be the next steps of receiving from the user's computer device a first token associated with the received request to verify purchase of a previously purchased electronic ticket and to obtain a visual validation display object; receiving from at least one of the user's computer device and a wireless communication device (5) attached to the additional item a second token associated with the received request to verify purchase of a previously purchased electronic ticket and to obtain a visual validation display object. This is to say that the second token may be transmitted from the wireless communication device (5), to the user's computer device, which then transmits it over the internet to server. Alternatively, the second token may be transmitted directly from the wireless communication device (5) to the server, by way of the internet. The wireless communication device attached to the additional item is selected from the group consisting of Bluetooth sensors, Bluetooth LE sensors, antennas, Global Positioning Systems (GPS), cellular data, WiFi, cell signal detection, radio frequency sensors, cell signal detection on LTE, LTE Advanced, cell signal detection on GSM, near field communication, wireless frequency standards of communication. The wireless communication device may also include a viewable screen or a touch-based interface. It may be in the form of a luggage tag, or a flexible item (such as a sticker) that is affixed to the additional item.

The first token, the second token and the third token may be the same for a valid electric ticket and a valid additional item. Alternatively, they may be different and the association between them stored in the data record. The data record resides on the server and associates at least one of the request to verify purchase of a previously purchased electronic ticket, a user file, the first token, the second token, the third token, the visual validation display object and the indicator that the additional item is permitted. The term token is known within the art and generally refers to electronic information that has no meaningful value if breached and serves as a reference to other sensitive data to obfuscate and secure the sensitive data during transmission and that causes validation of the purchased electronic ticket. The data record is stored on the server and contains the references to the tokens and all of the other data. The tokens serve as reference to the data stored on the data record but have no meaningful value if breached. The tokens may take the form of a unique number, such as an alphanumeric string, but the form may be also be different. The method may comprise the step of determining whether a third token associated with the purchased electronic ticket has been stored in a data record associated with the received request, and if it has, whether the first token and the second token are valid; and in dependence on the determination that the first token is valid, causing an activation of the purchased electronic ticket by transmitting to the user's computer device a data file comprising the visual validation display object that causes upon visual recognition by the ticket taker, the user to be permitted to utilize the service monitored by the ticket taker and in dependence on the determination that the second token is valid including in the visual validation display object an indicator that the additional item is permitted.

A transportation passenger who is paying a fare for riding a form of transportation (airplane, bus, train, ferry, etc.) may sometimes bring/carry-on a piece of luggage, suitcase, briefcase, bicycle, musical instrument, wheelchair, car/vehicle/automobile (in the case of a ferry that carries both passengers and cars) etc. Many transportation providers will charge an extra fee for a passenger to bring onboard any of these items. As ticketing/fare payments have become more automated, transportation providers are looking for methods to make sure that passengers are paying a carry-on or bring-on-board cost associated with their fare.

In one use case, this cost may not be assessed until the passenger is about to board the transportation vehicle. In this use case, the ticketed passenger's luggage, suitcase, briefcase, bicycle, instrument, wheelchair, or car/vehicle/automobile will be assessed the appropriate fee and the account of the ticketed passenger will be charged. There is generally a visual check, camera detection system (See FIG. 23, camera (6)) or checkin/dropoff where they interact with a human or automated kiosk. This may be one way in which the system "knows" there is an additional item for which a charge applies (e.g. carry-on a piece of luggage, suitcase, briefcase, bicycle, musical instrument, wheelchair, car/vehicle/automobile). A unique virtual token (software code that securely identifies something in a software encrypted format) will be associated with the users mobile device and the same OR a corresponding token will also be distributed to hardware integrated to the luggage, suitcase, briefcase, bicycle, instrument, wheelchair, or car/vehicle/automobile. The hardware on the luggage, suitcase, briefcase, bicycle, instrument, wheelchair, or car/vehicle/automobile may be as simple as a Bluetooth device (or a similar wireless communications standard) that can wirelessly communicate to/from other mobile devices, sensors or beacons and store the secure Token ID indefinitely or on a time limited basis. The hardware might also be a more complex solution that includes interfaces like a viewable screen, finger touch-based interface, multiple wireless communication formats (Near Field Communication, Bluetooth, or other radio/wireless frequency standards of communication). The concept includes any hardware for which a wireless frequency standard might be utilized as a communications and storage solution to manage a token or software-based security keys for the purposes of validating that a piece of luggage, suitcase, briefcase, bicycle, instrument, wheelchair, or car/vehicle/automobile has been paid for and belongs to a specific ticketed passenger that may or may not be on the same vehicle depending on the security requirements of the transportation operator.

In this use case, one or multiple pieces of luggage, suitcase, briefcase, bicycle, instrument, wheelchair, or car/vehicle/automobile will be assessed the fee and charged to the ticketed passenger when they are being put onto the transportation vehicle. A billable account (bank account, credit card, debit card, other form of electronic payment methodology) will be charged a fee in order to allow the luggage, suitcase, briefcase, bicycle, instrument, wheelchair, or car/vehicle/automobile onboard the transportation vehicle.

In another use case, this cost may have been paid/assessed ahead of time and there needs to be a verification of the luggage, suitcase, briefcase, bicycle, instrument, wheelchair, car/vehicle/automobile to associate it with the ticketed passenger to ensure from a security perspective that only items associated with a ticketed passenger are on-board and similarly that ticketed passengers have indeed paid the cost for the item they are bringing on board.

Operating Environment:

The system operates on one or more computers, typically one or more file servers connected to the Internet. The system is typically comprised of a central server that is connected by a data network to a user's computer. The central server may be comprised of one or more computers connected to one or more mass storage devices. A website is a central server that is connected to the Internet. The typical website has one or more files, referred to as web-pages, that are transmitted to a user's computer so that the user's computer displays an interface in dependence on the contents of the web-page file. The web-page file can contain HTML or other data that is rendered by a program operating on the user's computer. That program, referred to as a browser, permits the user to actuate virtual buttons or controls that are displayed by the browser and to input alphanumeric data. The browser operating on the user's computer then transmits values associated with the buttons or other controls and any input alphanumeric strings to the website. The website then processes these inputs, in some cases transmitting back to the user's computer additional data that is displayed by the browser. The precise architecture of the central server does not limit the claimed invention. In addition, the data network may operate with several levels, such that the user's computer is connected through a fire wall to one server, which routes communications to another server that executes the disclosed methods. The precise details of the data network architecture does not limit the claimed invention. Further, the user's computer may be a laptop or desktop type of personal computer. It can also be a cell phone, smart phone or other handheld device. The precise form factor of the user's computer does not limit the claimed invention. In one embodiment, the user's computer is omitted, and instead a separate computing functionality provided that works with the central server. This may be housed in the central server or operatively connected to it. In this case, an operator can take a telephone call from a customer and input into the computing system the customer's data in accordance with the disclosed method. Further, the customer may receive from and transmit data to the central server by means of the Internet, whereby the customer accesses an account using an Internet web-browser and browser displays an interactive webpage operatively connected to the central server. The central server transmits and receives data in response to data and commands transmitted from the browser in response to the customer's actuation of the browser user interface.

A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The method described herein can be executed on a computer system, generally comprised of a central processing unit (CPU) that is operatively connected to a memory device, data input and output circuitry (10) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory.

Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the specification is intended only to provide an extremely detailed disclosure of the present invention and is not intended to be limiting.

Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention, as defined by the following claims.

What is claimed:

1. A method performed by a server system and associated devices for obtaining visual validation of the possession of a purchased electronic ticket and previous payment for an additional item on a user's computer device for presentation to a ticket taker comprising:

receiving from the user's computer device a request to verify purchase of an electronic ticket and to obtain a visual validation display object that confirms that the user possesses the electronic ticket and has previously paid for at least one additional item for utilization of a service monitored by the ticket taker, the visual validation display object being configured to be readily recognizable visually by the ticket taker;

receiving from the user's computer device a first token associated with the received request to verify purchase of the electronic ticket and to obtain a visual validation display object;

receiving from at least one of the user's computer device and a wireless communication device attached to the additional item, a second token associated with the received request to verify purchase of the electronic ticket and to obtain a visual validation display object;

determining whether a third token associated with the electronic ticket is stored in a data record associated with the received request, and in response to a stored third token, determining whether the first token and the second token are valid; and in dependence on the determination that the first token is valid, causing an activation of the electronic ticket by transmitting to the user's computer device a data file comprising the visual validation display object that causes upon visual recognition by the ticket taker, the user to be permitted to utilize the service monitored by the ticket taker, and in dependence on the determination that the second token is valid, including in the visual validation display object an indicator that the additional item is permitted, and performing a secondary confirmation of the additional item by a camera check point having a camera device, wherein the wireless communication device that is attached to the additional item comprises a reusable physical media with a viewable screen, and further comprising:

integrating the reusable physical media with the user's computer device and synchronizing the reusable physical media with the user's computer device for the visual validation display object to be displayed on the reusable physical media, wherein the reusable physical media is configured to change based on instructions from the user's computer device, and wherein the reusable physical media has a display format that is configured to display data information, colors, and animation, and monitoring operation of the user's computer device when the visual validation display object is displayed on the user's computer device to check for a condition that the user captures an image of the visual validation display object and, upon detection of the condition, logging the activity and sending an alert data message to the server system.

2. The method of claim 1, wherein the first token, the second token and the third token are the same for a valid electronic ticket and a valid additional item.

3. The method of claim 1, wherein the data record resides on the server and associates at least one of the request to verify purchase of the electronic ticket, a user file, the first token, the second token, the third token, the visual validation display object and the indicator that the additional item is permitted.

4. The method of claim 1, further comprising:
in response to the determining whether a third token associated with the purchased electronic ticket is stored in the data record results in a determination that no such token has been stored, initiating confirmation that the electronic ticket has been purchased;

in dependence on such confirmation, storing a third token in the data record associated with the electronic ticket; and transmitting to the user's computer device a visual validation display object corresponding to the electronic ticket.

5. The method of claim 1, further comprising:
storing in the data record associated with the electronic ticket a data value representing a predetermined lock time;

determining whether a duration of time from the transmission of the visual validation display object to the predetermined lock time has expired; and in dependence on such determination, permitting or not permitting the visual validation display object to be transmitted to the user's computer device.

6. The method of claim 1, further comprising:
transmitting an authorization key to the user's computer device that transmitted the received request.

7. The method of claim 6, further comprising:
encrypting the visual validation display object using the authorization key.

8. The method of claim 6, further comprising:
encrypting the visual validation display object with a public key of a public/private key pair for which the transmitted authorization key is an associated private key.

9. The method of claim 1, further comprising:
establishing a persistent channel between the server system and the user's computer device, the persistent channel being configured to permit the server system to push data to the user's computer device in the absence of a specific request for such data being initiated by the user's computer device.

10. The method of claim 9, further comprising:
transmitting a command to the user's computer device that causes the transmitted visual validation display object to be automatically deleted from the user's computer device.

11. The method of claim 9 further comprising:
transmitting commands that cause the server system to control a computer process operating on the user's computer device in order to cause the user's computer device to receive the visual validation display object, display the validation display visual object on the user's computer device, and automatically delete the validation display visual object.

12. The method of claim 9 where the persistent channel is a bi-directional and full-duplex communications channel.

13. The method of claim 9 where the step of transmitting the visual validation display object is further comprised of:
transmitting in a manner to cause the visual validation display object to be automatically displayed on a screen without the user having to input a command to cause the transmission of the validating visual object.

14. The method of claim 9 further comprising:
transmitting to the user's computer device through the persistent channel a visual image comprising one of an advertisement or a discount coupon.

15. The method of claim 14 further comprising:
selecting a visual image for transmission to the user's computer device from a plurality of stored visual images, said selection step made in dependence on data associated with the purchased electronic ticket.

16. The method of claim 15 where the selection step is further comprised of
determining predetermined features of the validated ticket or purchasing transaction and then making a selection on the basis of those features.

17. The method of claim 9 further comprising:
transmitting an image that encodes a data value that corresponds to data representing indicia of identity of the persistent channel.

18. The method of claim 17 further comprising:
receiving from the user's computer device a request to provide a payment authorization, and in response, performing the transmitting an image step;
receiving a request to verify a purchase transaction, said request containing a challenge data;

determining whether the challenge data corresponds to the identity of the persistent channel used to transmit the image; and causing a payment to be made to a payment entity associated with the received request to verify the purchase transaction.

19. The method of claim 1, wherein the additional item is selected from the group of luggage, suitcase, briefcase, bicycle, musical instrument, wheelchair, car, vehicle, motorcycle, automobile.

20. The method of claim 1, wherein the wireless communication device attached to the additional item is selected from the group of Bluetooth sensors, Bluetooth LE sensors, antennas, Global Positioning Systems (GPS), cellular data, WiFi, cell signal detection, radio frequency sensors, cell signal detection on LTE, LTE Advanced, cell signal detection on GSM, near field communication, wireless frequency standards of communication.

21. A system for obtaining visual validation of possession of a purchased electronic ticket and previous payment for an additional item on a user's computer device for presentation to a ticket taker, the system comprising:
one or more computers operatively connected that are configured to:
receive from the user's computer device a request to verify purchase of an electronic ticket and to obtain a visual validation display object that confirms that the user possesses the electronic ticket and has previously paid for at least one additional item for utilization of a service monitored by the ticket taker, the visual validation display object configured to be readily recognizable visually by the ticket taker;
receive from the user's computer device a first token associated with the received request to verify purchase of the electronic ticket and to obtain a visual validation display object;
receive from at least one of the user's computer device and a wireless communication device attached to the additional item a second token associated with the received request to verify purchase of the electronic ticket and to obtain a visual validation display object;
determine whether a third token associated with the purchased electronic ticket has been stored in a data record associated with the received request, and if it has, whether the first token and the second token are valid; and
in dependence on the determination that the first token is valid, causing an activation of the purchased electronic ticket by transmitting to the user's computer device a data file comprising the visual validation display object that causes upon visual recognition by the ticket taker, the user to be permitted to utilize the service monitored by the ticket taker and
in dependence on the determination that the second token is valid including in the visual validation display object an indicator that the additional item is permitted,
wherein the wireless communication device that is attached to the additional item comprises a reusable physical media with a viewable screen, and
wherein the reusable physical media is integrated and synchronized with the user's computer device for the visual validation display object to be displayed on the reusable physical media,
wherein the reusable physical media is configured to change based on instructions from the user's computer device, and wherein the reusable physical media has a display format that is configured to display data information, colors, and animation, and
wherein the user's computer device is configured to monitor operation when the visual validation display object is displayed on the user's computer device to check for a condition that the user captures an image of the visual validation display object and, upon detection of the condition, is configured to log the activity and send an alert data message to a central server.

22. The system of claim 21, wherein the first token, the second token and the third token are the same for a valid electronic ticket and a valid additional item.

23. The system of claim 21, wherein the data record resides on the server and associates at least one of the request to verify purchase of the electronic ticket, a user file, the first token, the second token, the third token, the visual validation display object and the indicator that the additional item is permitted.

24. The system of claim 21, wherein the system is further configured to:
in response to the determining whether a third token associated with the electronic ticket is stored in a data record, results in a determination that no such token has been stored, initiating confirmation that the electronic ticket has been purchased;
in dependence on such confirmation, storing a third token in the data record associated with the purchased electronic ticket; and
transmitting to the user's computer device a visual validation display object corresponding to the purchased electronic ticket.

25. The system of claim 21, wherein the system is further configured to:
store in the data record associated with the electronic ticket a data value representing a predetermined lock time; and
determine whether a duration of time from the transmission of the visual validation display object to the predetermined lock time has expired; and
in dependence on such determination, permitting or not permitting the visual validation display object to be transmitted to the user's computer device.

26. The system of claim 21, wherein the system is further configured to:
transmit an authorization key to the user's computer device that transmitted the received request.

27. The system of claim 21, wherein the system is further configured to:
encrypt the visual validation display object using an authorization key.

28. The system of claim 21, wherein the system is further configured to:
encrypt the visual validation display object with a public key of a public/private key pair for which a transmitted authorization key is an associated private key.

29. The system of claim 21, wherein the system is further configured to:
establish a persistent channel between the server system and the user's computer device, the persistent channel being configured to permit the server system to push data to the user's computer device in the absence of a specific request for such data being initiated by the user's computer device.

30. The system of claim 29, where the persistent channel is a bi-directional and full-duplex communications channel.

31. The system of claim 21, wherein the system is further configured to:

transmit a command to the user's computer device that causes the transmitted visual validation display object to be automatically deleted from the user's computer device.

32. The system of claim 21, wherein the system is further configured to:
transmit commands that cause the server system to control a computer process operating on the user's computer device in order to cause the user's computer device to receive the visual validation display object,
display the validation display visual object on the user's computer device, and
automatically delete the validation display visual object.

33. The system of claim 21, where the step of transmitting the visual validation display object is further comprised of:
transmitting in a manner to cause the visual validation display object to be automatically displayed on a screen without the user having to input a command to cause the transmission of the validating visual object.

34. The system of claim 21, wherein the system is further configured to:
transmit an image that encodes a data value that corresponds to data representing indicia of identity of a persistent channel.

35. The system of claim 21, wherein the system is further configured to:
receive from the user's computer device a request to provide a payment authorization, and in response, performing a transmitting an image step;
receiving a request to verify a purchase transaction, said request containing a challenge data;
determining whether the challenge data corresponds to an identity of the persistent channel used to transmit the image; and
causing a payment to be made to a payment entity associated with the received request to verify the purchase transaction.

36. The system of claim 21, wherein the additional item is selected from the group of luggage, suitcase, briefcase, bicycle, musical instrument, wheelchair, car, vehicle, motorcycle, automobile.

37. The system of claim 21, wherein the wireless communication device attached to the additional item is selected from the group consisting of Bluetooth sensors, Bluetooth LE sensors, antennas, Global Positioning Systems (GPS), cellular data, WiFi, cell signal detection, radio frequency sensors, cell signal detection on LTE, LTE Advanced, cell signal detection on GSM, near field communication, wireless frequency standards of communication.

\* \* \* \* \*